United States Patent
Ghosh et al.

(10) Patent No.: US 7,990,993 B1
(45) Date of Patent: Aug. 2, 2011

(54) PLATFORM-INDEPENDENT CONTROL PLANE AND LOWER-LEVEL DERIVATION OF FORWARDING STRUCTURES

(75) Inventors: Kaushik Ghosh, Sunnyvale, CA (US); Kireeti Kompella, Los Altos, CA (US); Junan Chen, San Jose, CA (US); Raj Tuplar, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 413 days.

(21) Appl. No.: 12/266,298

(22) Filed: Nov. 6, 2008

Related U.S. Application Data

(63) Continuation-in-part of application No. 12/034,299, filed on Feb. 20, 2008, now Pat. No. 7,649,904.

(60) Provisional application No. 61/109,695, filed on Oct. 30, 2008.

(51) Int. Cl.
*H04L 12/54* (2006.01)

(52) U.S. Cl. ..................................... 370/428

(58) Field of Classification Search ............... 370/389, 370/400, 401, 352, 229, 360, 395, 351, 466, 370/428, 235, 412, 390; 379/238; 725/143
See application file for complete search history.

(56) References Cited

U.S. PATENT DOCUMENTS

| | | | | |
|---|---|---|---|---|
| 6,873,603 | B1* | 3/2005 | Ivaturi | 370/255 |
| 7,649,904 | B1* | 1/2010 | Ghosh et al. | 370/428 |
| 7,761,500 | B1* | 7/2010 | Eckert et al. | 709/203 |
| 2002/0176363 | A1* | 11/2002 | Durinovic-Johri et al. | 370/237 |
| 2003/0026268 | A1* | 2/2003 | Navas | 370/400 |
| 2004/0114595 | A1* | 6/2004 | Doukai | 370/389 |
| 2004/0174825 | A1* | 9/2004 | Li et al. | 370/254 |
| 2005/0226201 | A1* | 10/2005 | McMillin | 370/348 |
| 2006/0235995 | A1* | 10/2006 | Bhatia et al. | 709/238 |
| 2007/0206492 | A1* | 9/2007 | Zelig et al. | 370/218 |
| 2008/0137660 | A1* | 6/2008 | Olakangil et al. | 370/392 |
| 2008/0198865 | A1* | 8/2008 | Rudnick et al. | 370/406 |
| 2009/0259734 | A1* | 10/2009 | Morikawa | 709/220 |

* cited by examiner

*Primary Examiner* — Pankaj Kumar
*Assistant Examiner* — Prenell P Jones
(74) *Attorney, Agent, or Firm* — Shumaker & Sieffert, P.A.

(57) ABSTRACT

A network device includes a processor that executes a software module above an operating system of a network device, wherein the software module is configured to create a set of forwarding structures for use in forwarding network traffic with the network device without regard to limitations of an underlying architecture of the forwarding plane. The network device also includes a forwarding structure control module operative within or below the operating system of the network device, wherein the forwarding structure control module is configured to create a set of derived forwarding structures based on the set of forwarding structures provided by the software module for installation in the forwarding information of the forwarding plane. The derived set of forwarding structures is created in accordance with the limitations of the underlying architecture of the forwarding plane.

22 Claims, 12 Drawing Sheets

PLATFORM-INDEPENDENT CONTROL PLANE AND LOWER-LEVEL DERIVATION OF FORWARDING STRUCTURES

This application is a continuation-in-part of application Ser. No. 12/034,299, filed Feb. 20, 2008. This application also claims the benefit of U.S. Application Ser. No. 61/109,695, filed Oct. 30, 2008. The entire content of both applications is incorporated by reference herein.

TECHNICAL FIELD

The invention relates to packet-based computer networks and, more particularly, to forwarding packets within computer networks.

BACKGROUND

A computer network is a collection of interconnected computing devices that can exchange data and share resources. Example network devices include layer two devices that operate within the second layer of the Open Systems Interconnection (OSI) reference model, i.e., the data link layer, and layer three devices that operate within the third layer of the OSI reference model, i.e., the network layer. Network devices within computer networks often include a routing engine that provides control plane functionality for the network device. In some cases, the network devices may also include a plurality of packet forwarding engines and a switch fabric that collectively provide a forwarding plane for forwarding network traffic.

The routing engine provides control plane functions storing network topology in the form of routing tables, executing routing protocols to communicate with peer routing devices and maintain and update the routing tables, and providing a management interface to allow user access and configuration of the network device. The routing engine maintains routing information that describes a topology of a network, and derives a forwarding information structure, e.g., a forwarding information base (FIB), in accordance with the routing information. In general, the routing information represents the overall topology of the network and defines routes to destinations/prefixes within the network.

In contrast, the forwarding information is generated based on selection of certain routes within the network and maps packet key information (e.g., destination information and other select information from a packet header) to one or more specific next hops and ultimately to one or more specific output interfaces of interface cards of the network device. Typically, the routing engine installs forwarding structures into each of the PFEs to control forwarding of traffic within the data plane. This allows the FIB in each of PFEs to be updated without degrading packet forwarding performance of routing node. In some instances, the routing engine may drive separate FIBs which are copied to respective PFEs.

Different types of underlying PFE hardware architectures (e.g., chipset platforms) may have different built-in capabilities and may require installed forwarding information to meet certain requirements or conform to certain formats in order for the PFEs to forward network traffic in an optimal manner. Currently, applications running on the routing engine have to create forwarding structures to be installed in the FIB based on the particular requirements of the underlying forwarding plane technology. These forwarding structures are pushed down to the forwarding plane. This requires the routing engine to be aware of the requirements of the different PFEs and tailor the forwarding structures to the limitations of each PFE. This can result in scalability problems as networks grow.

SUMMARY

In general, techniques are described by which a data-forwarding network device, such as a switch or a router, allows for an internal routing engine to operate in a manner that is independent of the underlying forwarding platform when creating forwarding structures to be installed in the forwarding platform. The techniques allow for the routing engine to create generic forwarding information, while the lower layers of the network device handle deriving specific forwarding structures that are tailored to the particular requirements of the underlying forwarding plane architecture.

The techniques described herein address, for example, situations in a network device in which forwarding structures used by the forwarding platform (i.e., forwarding plane) of the network device are derived for particular forwarding applications by software modules running on a higher-level control plane of the network device. The techniques of the invention are applicable to any situation in which the forwarding structures are "pushed down" from the control plane to the forwarding plane of a network device, regardless of whether the forwarding structures are forwarding next hops, interfaces, or other specific forwarding structures.

As described herein, in some embodiments, specific derivation of forwarding information can be offloaded to a packet forwarding engine of the network device and performed at the time a packet is being forwarded. That is, some embodiments of packet forwarding described herein incorporate forwarding hardware (i.e., chipsets) capable of natively processing abstract forwarding structure requirements from the control plane (i.e., when forwarding traffic) to derive the specific forwarding structure (e.g., next hops) to which to forward traffic. As described herein, an advanced chipset incorporated within the egress interface card(s) of the packet forwarding engine may have such capability built-in (i.e., "native") and is referred to herein as a "second-generation chipset." The second-generation chipsets therefore implement richer forwarding models directly in hardware.

In other configurations, some or all of the packet forwarding engines or other hardware components of the network device may be based on "first-generation chipsets" having limited forwarding structure derivation capabilities, i.e., that lack the capability required for such forwarding structure expansion and an on-the-fly comparison for purposes of split-horizon forwarding, for example. These capabilities are referred to as "non-native" with respect to such chipsets. In this case, the packet forwarding engines need to be configured with different forwarding structures tailored to the requirements of the first-generation chipsets. In this manner, the forwarding structure installed within the packet forwarding engine based on a first-generation chipset is generated to explicitly specify all next hops to which to forward network traffic.

In some situations, a network device may combine both forwarding components that incorporate first-generation chipsets with forwarding components that incorporate second-generation chipsets. That is, the network device may include a first subset of forwarding components having first-generation chipsets that lack the capability required for certain forwarding techniques and, therefore, require that the forwarding information installed by the control unit specify next hops or other forwarding structures in a particular manner. A second subset of forwarding components, perhaps newer forwarding components, installed within the network device may incorporate second-generation chipsets that are capable of deriving the appropriate next hops to which to forward packets on-the-fly (i.e., after receiving the inbound packet and prior to forwarding the packet). Thus, different forwarding component chipsets within a single network device may apply different techniques for packet forwarding structure derivation. Such a network device may be referred to as having a "mixed" architecture. Nevertheless, the techniques described herein allow high-level, control plane software executing on within the network router (such as layer two or layer three routing protocols) to utilize forwarding techniques such as flooding next hops, multicasting, and next hop chaining, and need not be burdened with ensuring that the forwarding structures necessary for these operations comply with requirements of the underlying forwarding plane architecture. This allows the control plane software to focus on maintaining topology information and other routing information for the network and need only generate the forwarding structures in a generic format based on the maintained information.

As described herein, generation of the forwarding structures tailored to the underlying chipset capabilities in this manner can be accomplished without modification to the high-level control plane software. That is, the high-level control plane software utilizes an abstract logical construct to represent some or all of the corresponding forwarding structures in the network associated with the traffic being forwarded. Moreover, a component operative below the high-level control plane software yet above the packet forwarding engine is utilized to perform generation and installation of forwarding information in the necessary format to specify all individual next hops to which to flood network traffic. As a result, the high-level control plane software executing within the network device still need not be concerned with specifics of the underlying forwarding plane architecture when maintaining topology information and other routing information for the network.

The techniques may provide one or more advantages. For example, the techniques allow for placing hardware-based forwarding components having differing built-in functionality in the same network device (such as a multi-chassis, VPLS-enabled routing node), even when control plane software (e.g., routing process) executing as a software thread or process above an operating system of the control unit of the network device maintains routing information in a form that utilizes the a generic forwarding structure construct and relies on the underlying components for the specific forwarding structure expansion and derivation. This may allow for use of older forwarding plane chipsets and newer, more advanced chipsets in a routing node in a plug-and-play manner and/or in combination. Moreover, the techniques described herein may also allow older forwarding plane chipsets to be replaced with newer chipsets without requiring changes to the high-level control plane software. Thus, the techniques described herein are not limited to network devices having mixed architectures, but may also apply to network devices having a single type of forwarding plane architecture.

In one embodiment, a method comprises with a software module executing above an operating system of a network device, creating a set of forwarding structures for use in forwarding network traffic with the network device without regard to limitations of an underlying architecture of a forwarding plane of the network device, and providing the set of forwarding structures to a forwarding structure control module operative within or below the operating system of the network device. The method further includes, with the forwarding structure control module, creating a set of derived forwarding structures for installation in the forwarding plane based on the set of forwarding structures created by the software module, wherein creating the derived set of forwarding structures comprises creating the derived set of forwarding structures in accordance with the limitations of the underlying architecture of the forwarding plane. The method also includes installing the derived set of forwarding structures within the forwarding plane, receiving a packet on an interface of the network device, and processing the packet in accordance with the installed derived set of forwarding structures.

In another embodiment, a network device comprises an interface that receives network traffic from a network, a forwarding plane configured to forward the network traffic received by the network device to next hops in accordance with stored forwarding information, and a processor that executes a software module above an operating system of a network device, wherein the software module is configured to create a set of forwarding structures for use in forwarding network traffic with the network device without regard to limitations of an underlying architecture of the forwarding plane. The network device also includes a forwarding structure control module operative within or below the operating system of the network device, wherein the software module is configured to provide the set of forwarding structures to the forwarding structure control module. The forwarding structure control module is configured to create a set of derived forwarding structures based on the set of forwarding structures provided by the software module for installation in the forwarding information of the forwarding plane, wherein the forwarding structure control module is configured to create the derived set of forwarding structures in accordance with the limitations of the underlying architecture of the forwarding plane.

In another embodiment, the invention is directed to a computer-readable medium comprising instructions. The instructions cause a programmable processor to, with a software module executing above an operating system of a network device, create a set of forwarding structures for use in forwarding network traffic with the network device without regard to limitations of an underlying architecture of a forwarding plane of the network device. The instructions also cause the programmable processor to provide the set of forwarding structures to a forwarding structure control module operative within or below the operating system of the network device, and, with the forwarding structure control module, create a set of derived forwarding structures for installation in the forwarding plane based on the set of forwarding structures created by the software module, wherein creating the derived set of forwarding structures comprises creating the derived set of forwarding structures in accordance with the limitations of the underlying architecture of the forwarding plane. The instructions also cause the programmable processor to install the derived set of forwarding structures within the forwarding plane, receive a packet on an interface of the network device, and process the packet in accordance with the installed derived set of forwarding structures.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
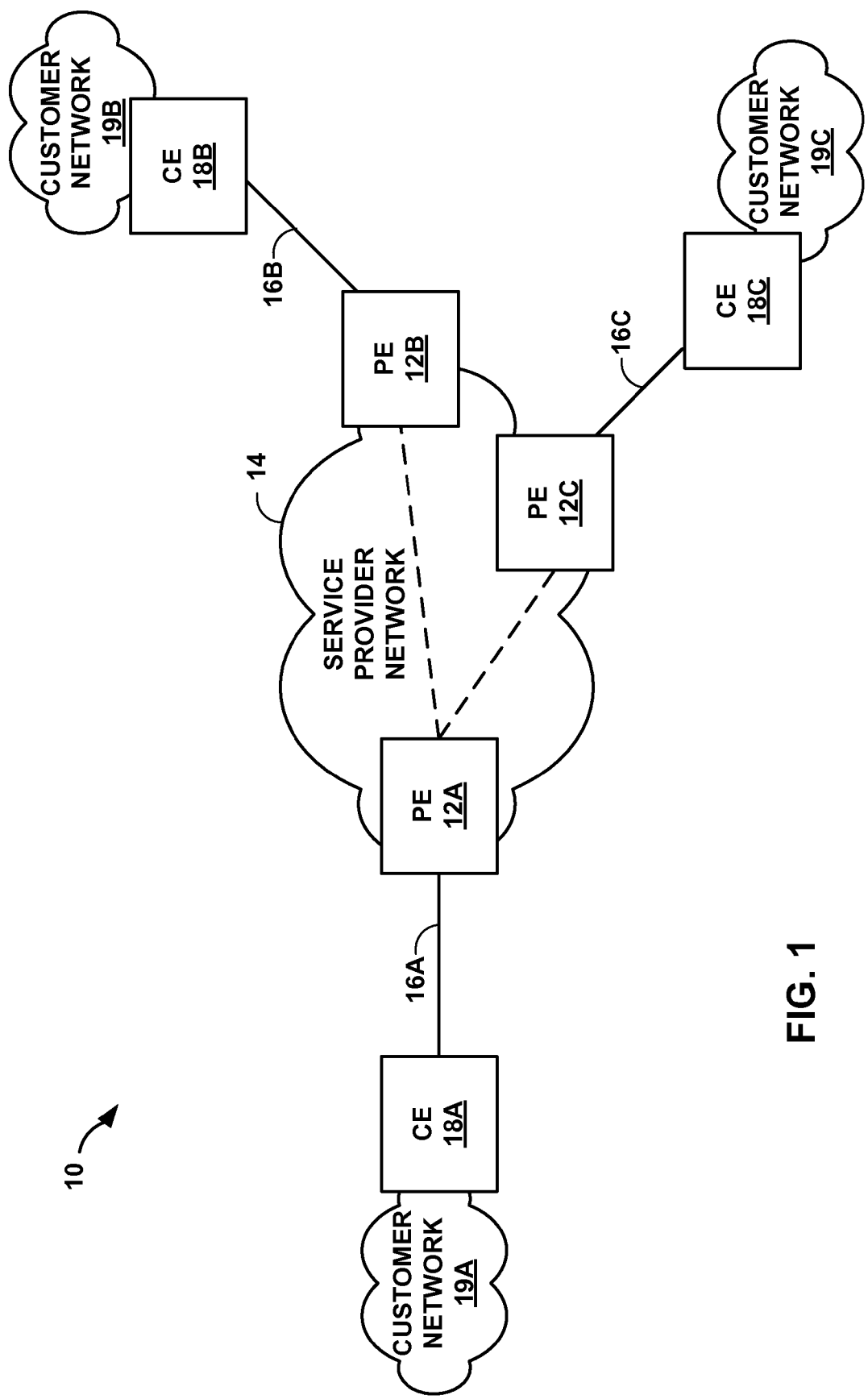
FIG. 1 is a block diagram illustrating an example system in which a provider edge router of a service provider network forwards network traffic in accordance with the principles of the invention.

The techniques described herein can be applied in a network device for a number of different situations in which forwarding structures are derived for particular packet-forwarding operations by software modules (e.g., processes, daemons, or other modules) running on a higher-level control plane of the network device. In these exemplary situations, the forwarding structures are pushed down to (i.e., installed within) a forwarding plane of the network device for forwarding packets or other data units in accordance with the forwarding structures. Several such example forwarding operations are described below to illustrate the techniques of the invention. Specifically, one example described below is the derivation of split-horizon flooding next hops for split-horizon forwarding. Another example described below is the derivation of next hops in the context of next hop chaining while forwarding packets. Yet another example described below is the derivation of multicast next hops for multicasting. A further example described below is using logical interfaces to represent subscribers in a broadband networking environment. However, the techniques of the invention are not limited to these particular examples. The techniques of the invention are applicable to any situation in which forwarding structures are pushed down from the control plane to and installed within forwarding hardware of the forwarding plane of a network device, regardless of whether the forwarding structures are forwarding next hops, interfaces, or other forwarding structures. For example, the techniques described herein are not limited to derivation of next hops, but may also apply to derivation of interfaces or other forwarding structures. For example, the techniques may also apply to automatically sensing some condition at the time packets are received, and based on the sensed condition, forming the interfaces on which to output packets. The techniques may therefore be applicable to any network device that forwards packets.

As one example, a forwarding structure control module executing within a kernel of the control plane of a network device may be configured with data specifying the different types of forwarding hardware components installed (e.g., chipset type) within the forwarding plane of the network device. Based on this information, the forwarding structure control module provides different information to the forwarding components depending on the chipset type and the chipsets native support for different forwarding operations. This allows each of the forwarding components to obtain next hops according to its own functionality for use in packet forwarding. In this manner, high-level control plane software executing above an operating system within the control unit of the network device need not be burdened with the different flooding techniques being used at the packet forwarding level. In other words, the high-level control plane software "sees" the same abstraction regardless of how the split-horizon rule is implemented within the different forwarding hardware components within the forwarding plane of the network device. This consistency of presentation to the high-level control plane software may be easier to program to and may also allow for better control plane scaling.

FIG. 1 is a block diagram illustrating an example system 10 in which a provider edge (PE) router 12A of service provider network 14 forwards network traffic in accordance with the principles of the invention. In the illustrated example of FIG. 1, PE routers 12A-12C ("PE routers 12") are provider edge routers of a service provider network 14 administered by a network service provider, and provide connectivity for customer networks 19A-19C ("customer networks 19"). In particular, PE routers 12 are coupled to customer edge (CE) routers 18A-18C ("CE routers 18") of customer networks 19 via access links 16A-16C, respectively. PE routers 12 communicate with CE routers 18 to provide customer networks 19 with access to service provider network 14.

As shown, each of customer networks 19 may be a network for a site of an enterprise. Each of customer networks 19 may include one or more computing devices (not shown), such as personal computers, laptop computers, handheld computers, workstations, servers, switches, printers, or other devices. Service provider network 14 may be coupled to one or more networks administered by other service providers, and may thus form part of a large-scale public network infrastructure, e.g., the Internet. Consequently, customer networks 19 may be viewed as edge networks of the Internet. The service provider may provide computing devices within customer networks 19 with access to the Internet via service provider network 14, which allows computing devices within one of customer networks 19 to communicate with computing devices within the Internet or the other one of customer networks 19. Service provider network 14 may include a variety of other network devices (not shown), such as routers, switches, servers, and the like and may be connected to other networks.

The configuration of the network environment illustrated in FIG. 1 is merely exemplary. For example, service provider network 14 may include any number of provider edge routers coupled to one or more customer networks. Nonetheless, for ease of description, only customer networks 19A-19C are illustrated in FIG. 1.

In one embodiment, network 10 comprises a virtual private local area network service (VPLS) domain used to extend remote customer networks 19, i.e., VPLS sites, through intermediate service provider network 14 and possibly other intermediate networks, such as the Internet, as if the intermediate networks do not exist. VPLS domains may provide any-to-any, point-to-point (P2P), or point-to-multipoint (P2MP) connectivity, and may transport layer two (L2) communications, such as Ethernet packets, between customer networks 19 via service provider network 14 in a P2MP fashion. CE routers 18 as well as PE routers 12 execute the VPLS protocol and, in this manner, are VPLS-enabled routers. In a typical configuration, CE routers 18 coupled to the customer networks 19 define a full mesh of P2P label switched paths (LSPs) within the service provider network 14 to carry encapsulated L2 communications as if customer networks 19 were directly attached to the same local area network (LAN).

As described herein, L2 devices within network 10 that operate within the VPLS domain apply the split-horizon rule to avoid data loops in the forwarding plane. As one example, PE routers 12 are described as achieving split-horizon flooding by utilizing the logical construct of "flooding next hop" identifiers to logically represent the corresponding next hops (i.e., neighboring L2 nodes adjacent the network device) in the L2 network to which to flood network traffic. More specifically, when maintaining network topology and forwarding information, high-level control plane software (e.g., the VPLS protocol) executing on each PE router 12 utilizes individual flooding next hop identifiers when generating forwarding information, where each flooding next hop identifier logically represents all of the L2 devices to which to flood certain traffic without regard to the specific, individual next hops in the L2 network and/or the ingress interface. This allows high-level control plane software executing within PE routers 12 (such as L2/L3 routing protocols) to more easily maintain network topology information and forwarding information without being concerned with specifics of the split-horizon rule. That is, the high-level control plane software need not be responsible for ensuring compliance with the split-horizon rule when maintaining topology information and other routing information for the L2 network.

As described herein, in some configurations flood list expansion and split-horizon rule implementation may be offloaded to packet forwarding engines of the VPLS-enabled routers PE 12 and performed at the time L2 VPLS packets are being forwarded. That is, in some embodiments some or all of PE routers 12 may incorporate packet forwarding engines that include forwarding hardware (i.e., chipsets) capable of processing forwarding information having flooding next hop identifiers 'on-the-fly' (i.e., when forwarding traffic) to derive for each identifier the specific plurality of next hops to which to flood traffic. For example, when flooding traffic, an egress interface card or other hardware component of the packet forwarding engine processes the flooding next hop identifier specified in the forwarding information and then compares the egress port to which the flooding packet is being sent with the ingress port by which the original L2 packet was received. The hardware component then automatically drops the flooding packet if the egress port is identical to the ingress port. In other words, the hardware component does not flood a copy of the packet out the port that corresponds to the ingress port. As described herein, an advanced chipset incorporated within the egress interface card of packet forwarding engine may have such capability built-in and is referred to herein as a "second-generation chipset."

In other configurations, some or all of PE routers 12 may have one or more packet forwarding engines or other hardware components that are based on "first-generation chipsets" that lack the capability required for such dynamic flood list expansion and an on-the-fly comparison for purposes of split-horizon compliance. In this case, the packet forwarding engine does not support (i.e., natively recognize) flooding next hop identifiers and must be configured with forwarding information that maps an ingress port to a specific plurality of next hops in the L2 network 10 to which to flood the network packet. In this manner, the forwarding information installed within the packet forwarding engine must be generated to specify all next hops to which to flood network traffic and specifically excludes the next hop associated with the ingress port in order to perform split-horizon flooding.

In this case, any of PE routers 12 having forwarding hardware based on "first-generation chipsets" is configured with a lower-level component referred to herein as a forwarding structure control module. The forwarding structure control module operates at a lower-level of the control plane for each of PE routers 12 and derives the "split horizon flooding next hops" from the flooding next hop identifiers on behalf of the high-level, control plane software. For example, the lower-level forwarding structure control module of PE router 12A derives the particular next hops by first performing flood list expansion to logically expand the flooding next hop identifiers maintained by the high-level control plane software into the complete list of next hops within the L2 network. For example, with respect to forwarding information for inbound traffic received from CE 18A, the forwarding structure control module may expand a flooding next hop identifier FNH1 to the set of actual next hops {NH1, NH2, and NH3} representing neighboring devices CE 18A, PE 12B and PE 12C. Next, the lower-level components of PE router 12A further processes the expanded list to exclude the NH1 associated with the ingress port for traffic received from CE 18A in order to ensure compliance with split-horizon flooding.

Continuing the example from above, assuming the flooding next hop identifier FNH1 is used in association with L2 packets received from CE router 18A on an interface associated with NH1, the lower-level forwarding structure control module modifies the forwarding information produced by the upper-level, control plane software to replace the flooding next hop identifier FNH1 within the forwarding information with a set of specific next hops {NH2 and NH3} to the exclusion of the next hop associated with the ingress interface (NH1 in this example). Alternatively, the forwarding structure control module may modify the forwarding information to replace the flooding next hop identifier FNH1 within the forwarding information with a different identifier, i.e., a split-horizon flooding next hop identifier, that indexes data specifying the set of specific next hops {NH2 and NH3}.

As described in further detail below, a one-to-one relationship may exist between the interfaces and the elemental unicast next hops, even in the case that the L2 router includes a plurality of packet forwarding engines, and the lower-level components responsible for derivation of the split-horizon flooding next hops map the interfaces to next hops according to an index. Based on this information, the lower-level forwarding structure control module may derive split-horizon flooding next hops to which to forward traffic for each interface associated with a given packet forwarding component of the device. For example, the lower-level forwarding structure control module may determine which next hop corresponds to each interface based on this one-to-one relationship. The forwarding structure control module then derives the complete list of split-horizon flooding next hops for each ingress interface by removing the next hop that corresponds to that ingress interface from a set of all next hops associated with the L2 domain 10.

For example, if interfaces $I_1$, $I_2$, and $I_3$ of PE router 12A correspond to next hops CE 18A, PE 12B, and PE 12C, respectively, the end result of the derived split-horizon flooding next hops may be the following routes:

$$\begin{cases} I_1 \rightarrow FNH_1 \rightarrow \{PE12B, PE12C\} \\ I_2 \rightarrow FNH_2 \rightarrow \{CE18A, PE12C\}, \\ I_3 \rightarrow FNH_3 \rightarrow \{CE18A, PE12B\} \end{cases}$$

where $FNH_1$-$FNH_3$ are flooding next hop identifiers used in forwarding information in association with ingress interfaces based on an index, and where each derived set { ... } contains the list of specific next hops to which to flood traffic from received on that interface.

The lower-level forwarding structure control module of each PE12 selectively updates the forwarding information to map each of the interfaces to the respective derived split-horizon flooding next hops, and the updated the forwarding information is then installed within the appropriate hardware components of the packet forwarding engine(s) of the router.

Although the techniques of the invention have been primarily described with respect to provider edge devices running VPLS, embodiments of the invention are not limited in this regard. Other network devices, such as routers within the core of a network or customer edge routers 18, may perform the functions described herein. In addition, other network protocols that make use of split-horizon flooding, e.g., network protocols for establishing a virtual local area network (VLAN) and forwarding traffic therein may employ the techniques described herein. Moreover, the devices may be applied by any L2 switch or other device operative to comply with the split-horizon rule.

Figure 2:
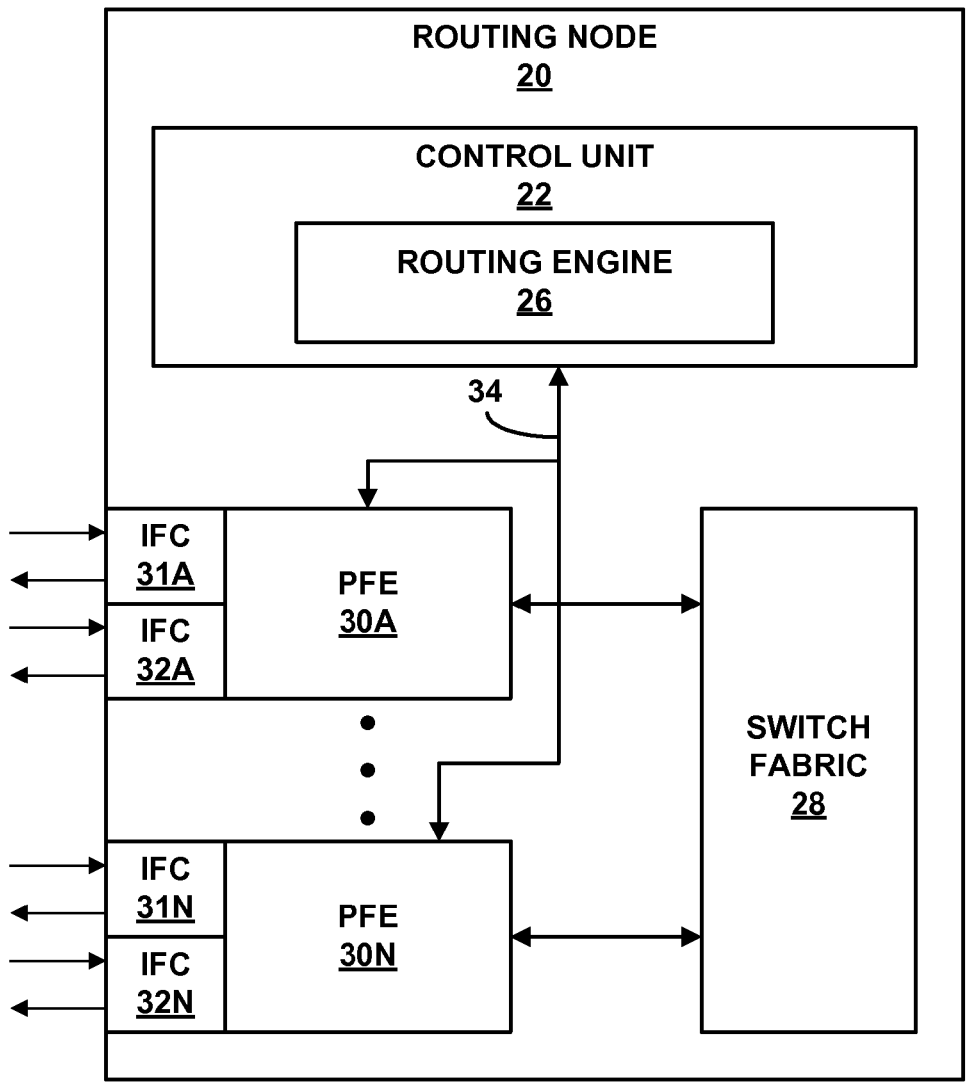
FIG. 2 is a block diagram illustrating an example routing node that creates forwarding structures to be installed in a forwarding plane in accordance with the principles of the invention.

FIG. 2 is a block diagram illustrating an example routing node 20 that creates forwarding structures to be installed in a forwarding plane in accordance with the principles described herein. Routing node 20 may comprise a router such as one of PE routers 12 or CE routers 18 of FIG. 1, a core router, or other network device. In this example, routing node 20 includes a control unit 22 that includes a routing engine 26 that provides control plane functionality for the device. Routing node 20 also includes a plurality of packet forwarding engines 30A-30N ("PFEs 30") and a switch fabric 28 that collectively provide a data plane for forwarding network traffic. PFEs 30 receive and send data packets via interface cards 31A-31N ("IFCs 31") and IFCs 32A-32N ("IFCs 32"). In other embodiments, each of PFEs 30 may comprise more or fewer IFCs. Although not shown, PFEs 30 may each comprise a central processing unit (CPU) and a memory. Switch fabric 28 provides a high-speed interconnect for forwarding incoming data packets to the correct one of PFEs 30 for transmission over a network.

Routing engine 26 provides control plane functions storing network topology in the form of routing tables, executing routing protocols to communicate with peer routing devices and maintain and update the routing tables, and providing a management interface to allow user access and configuration of routing node 20.

Routing engine 26 is connected to each of PFEs 30 by a dedicated internal communication link 34. For example, dedicated link 34 may comprise a 200 Mbps Ethernet connection. Routing engine 26 maintains routing information that describes a topology of a network, and derives a forwarding information base (FIB) in accordance with the routing information. In general, the routing information represents the overall topology of the network and defines routes to destinations/prefixes within the network. In contrast, the forwarding information is generated based on selection of certain routes within the network and maps packet key information (e.g., destination information and other select information from a packet header) to one or more specific next hops and ultimately to one or more specific output interfaces of IFCs 31, 32. Routing engine 26 may install a FIB into each of PFEs 30 to control forwarding of traffic within the data plane. This allows the FIB in each of PFEs 30 to be updated without degrading packet forwarding performance of routing node 20. In some instances, routing engine 26 may drive separate FIBs which are copied to respective PFEs 30.

Based on the stored FIBs, PFEs 30 flood copies of each received L2 packet to a plurality of next hops associated with the same layer two (L2) network as the interface on which the packet was received, wherein the plurality of next hops excludes a next hop that corresponds to the interface that received the packet (i.e., conforms to the split-horizon rule).

Routing node 20 may have one or more packet forwarding engines 30 or other hardware components that lack the capability required for dynamic flood list expansion and an on-the-fly comparison for purposes of split-horizon compliance. In this case, the packet forwarding engine does not support (i.e., recognize) flooding next hop identifiers and must be configured by control unit 22 with forwarding information that maps an ingress port to a specific plurality of next hops in the L2 network 10 to which to flood the network packet. For example, PFE 30A may comprise a first generation chipset that requires that the FIB installed by control unit 22 specify a plurality of next hops to which to flood copies of received packets, and is not capable of deriving the plurality of next hops to which to flood the copies of the packet from a single flooding next hop identifier.

Nevertheless, the high-level control plane software executing within routing engine 26 utilizes the logical construct of a flooding next hop identifier when generating the FIB. A forwarding structure control module operative below the high-level control plane software performs flood list expansion as well as generation and installation of forwarding information in the necessary format to specify all individual next hops to which to flood network traffic and to specifically exclude the next hop associated with the ingress interface port. As a result, the high-level control plane software executing on within routing engine 26 (such as L2/L3 routing protocols) need not be concerned with specifics of the split-horizon rule when maintaining topology information and forwarding information for the L2 network. In other words, the high-level control plane software "sees" a seamless abstraction regardless of how the split-horizon rule is followed within the forwarding components. The techniques may allow for better scaling when interfaces fail, join, or leave the VPLS domain.

A one-to-one relationship may exist between the interfaces of IFCs 31, 32 and the elemental unicast next hops within the L2 network, and the forwarding structure control module responsible for derivation of the split-horizon flooding next hops maps the interfaces to next hops according to an index. The lower-level forwarding structure control module determines which next hop corresponds to each interface based on this one-to-one relationship. The forwarding structure control module then derives the complete list of split-horizon flooding next hops for each ingress interface by removing the next hop that corresponds to that ingress interface from a set of all next hops associated with the L2 domain. The lower-level forwarding structure control module of routing engine 26 selectively updates the forwarding information to map each of the interfaces to the respective derived split-horizon flooding next hops, and the updated the forwarding information is then installed within the appropriate packet forwarding engine 30.

In another embodiment, each PFEs 30 of the L2-enabled device is configured with a 'slave' forwarding structure control module to internally derive split-horizon flooding next hops based on next hop information provided by the 'master' forwarding structure control module executing with control unit 22. In this embodiment, the 'slave' forwarding structure control modules of the forwarding components may follow a similar method for deriving the split-horizon flooding next hops using the one-to-one correspondence between the interfaces and next hops to remove the next hop that corresponds to the ingress interface from a set of all next hops within the L2 network.

Subsequently, routing node 20 may receive L2 VPLS traffic on an interface destined to a destination address that routing node 20 has not yet learned. Upon receiving the L2 VPLS traffic, PFE 30A references its forwarding information base (FIB) (not shown) using the ingress interface as a key to obtain the list of split-horizon flooding next hops associated with the ingress interface. PFE 30A then floods the L2 VPLS traffic to the plurality of next hops associated specified by the forwarding information.

In other embodiments, PFEs 30 may have "mixed" architectures, in which a first subset of PFEs 30 may comprise first-generation chipsets, while a second subset of PFEs 30 may comprise second- or third-generation chipsets. The second- or third-generation chipsets may not require that the forwarding information installed by the control unit specify the plurality of next hops to which to flood copies of the packet. Rather, the second- or third-generation chipsets may be capable of deriving the plurality of next hops to which to flood the copies of the packet on-the-fly from a single flooding next hop that represents all of the next hops within the L2 network. For example, the second- or third-generation chipsets may identify the ingress interface of a packet, on-the-fly prior to flooding the packet, and remove the next hop associated with the interface from the set of next hops to which the packet is flooded.

In some cases, a packet may ingress on an interface of a first-generation PFE 30A, but may need to be flooded out of one or more interfaces on a second-generation PFE 30B as well as one or more interfaces on first-generation PFE 30A. When PFE 30A references its FIB to obtain the list of split-horizon flooding next hops for a packet received on the ingress interface, first-generation PFE 30A may initially do a first lookup and send the packet over the switch fabric 28 to all of PFEs 30 that might be involved in forwarding the packet, including itself. When the packet re-ingresses to first-generation PFE 30A from switch fabric 28, first-generation PFE 30A may do another lookup with the original ingress interface as the lookup key to find out which of the interfaces of first-generation PFE 30A on which to flood the original packet, resulting in the split-horizon flooding behavior for the packet.

Thus, different PFE chipsets within PE router 12A may apply different techniques for split-horizon flooding. The forwarding structure control module executing within routing engine 26 may be configured with data specifying the type of chipset for each of PFEs 30. As a result, the forwarding structure control module may provide forwarding information in different formats to the PFEs 30 depending on the chipset type. This allows each of PFEs 30 to obtain split-horizon flooding next hops according to its own functionality for use in packet forwarding. In this manner, high-level software protocols (not shown) running above the operating system within control unit 22 may be unaware of the different flooding techniques being used at the packet forwarding level. This allows high-level control plane software executing on within the L2-enabled routing node 20 (such as L2/L3 routing protocols) to utilize flooding next hop identifiers to more easily maintain network topology information and forwarding information without being concerned with specifics of the split-horizon rule. That is, the high-level control plane software executing within routing node 20 need not be responsible for ensuring compliance with the split-horizon rule when maintaining topology information and other routing information for the L2 network. With the same abstraction being seamlessly presented to the high-level control plane software in this manner, it may be easier to program the high-level control plane software with respect to this consistent abstraction. These techniques may allow for better scaling when interfaces fail, join, or leave the VPLS domain.

Control unit 22 may be implemented solely in software, or hardware, or may be implemented as a combination of software, hardware or firmware. For example, control unit 22 may include one or more processors which execute software instructions. In that case, the various software modules of control unit 22 may comprise executable instructions stored on a computer-readable storage medium, such as computer memory or hard disk.

Figure 3A:
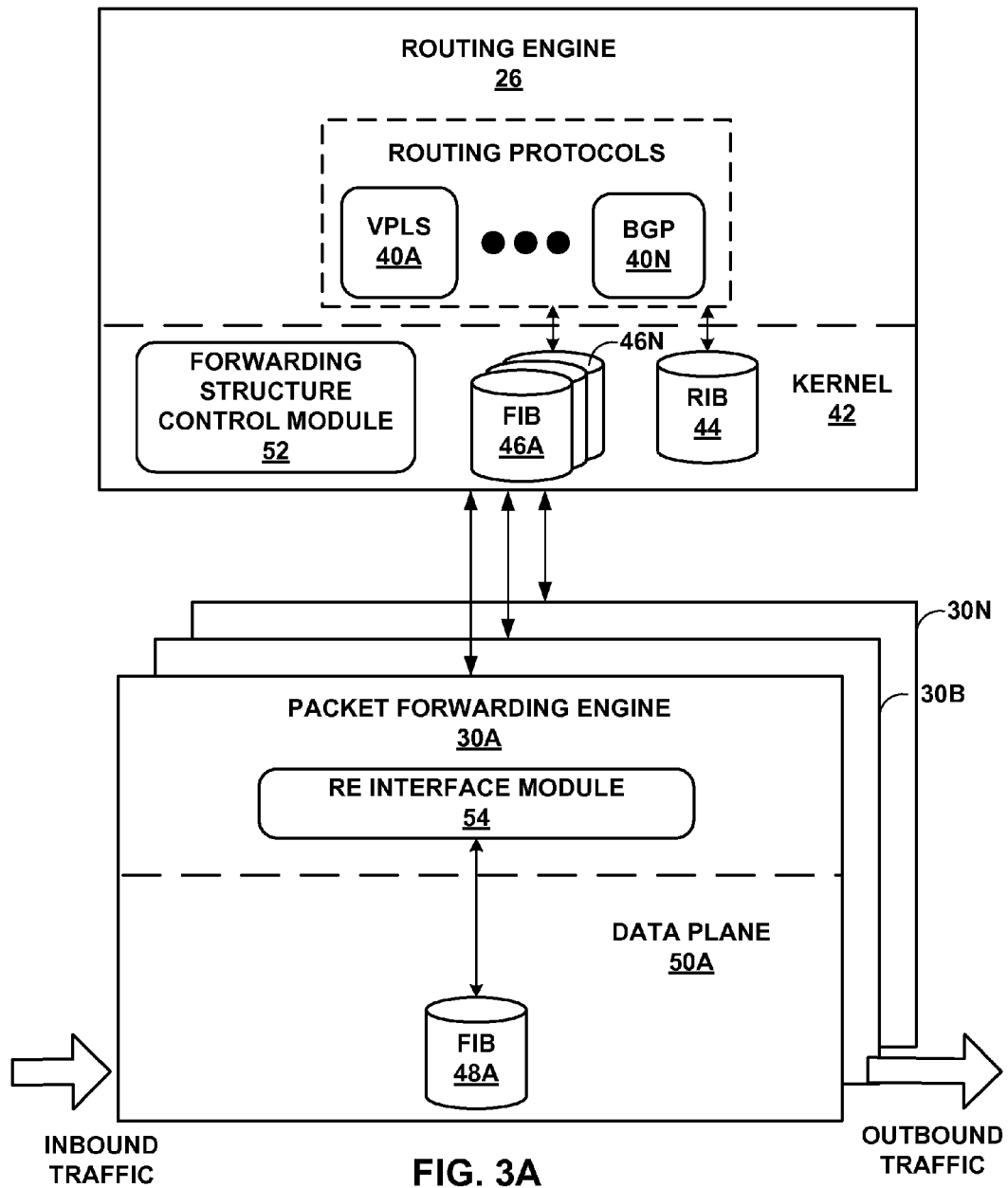
FIGS. 3A-3B are block diagrams illustrating a routing engine and a packet forwarding engine of the routing node of FIG. 2 in further detail.
Figure 3B:
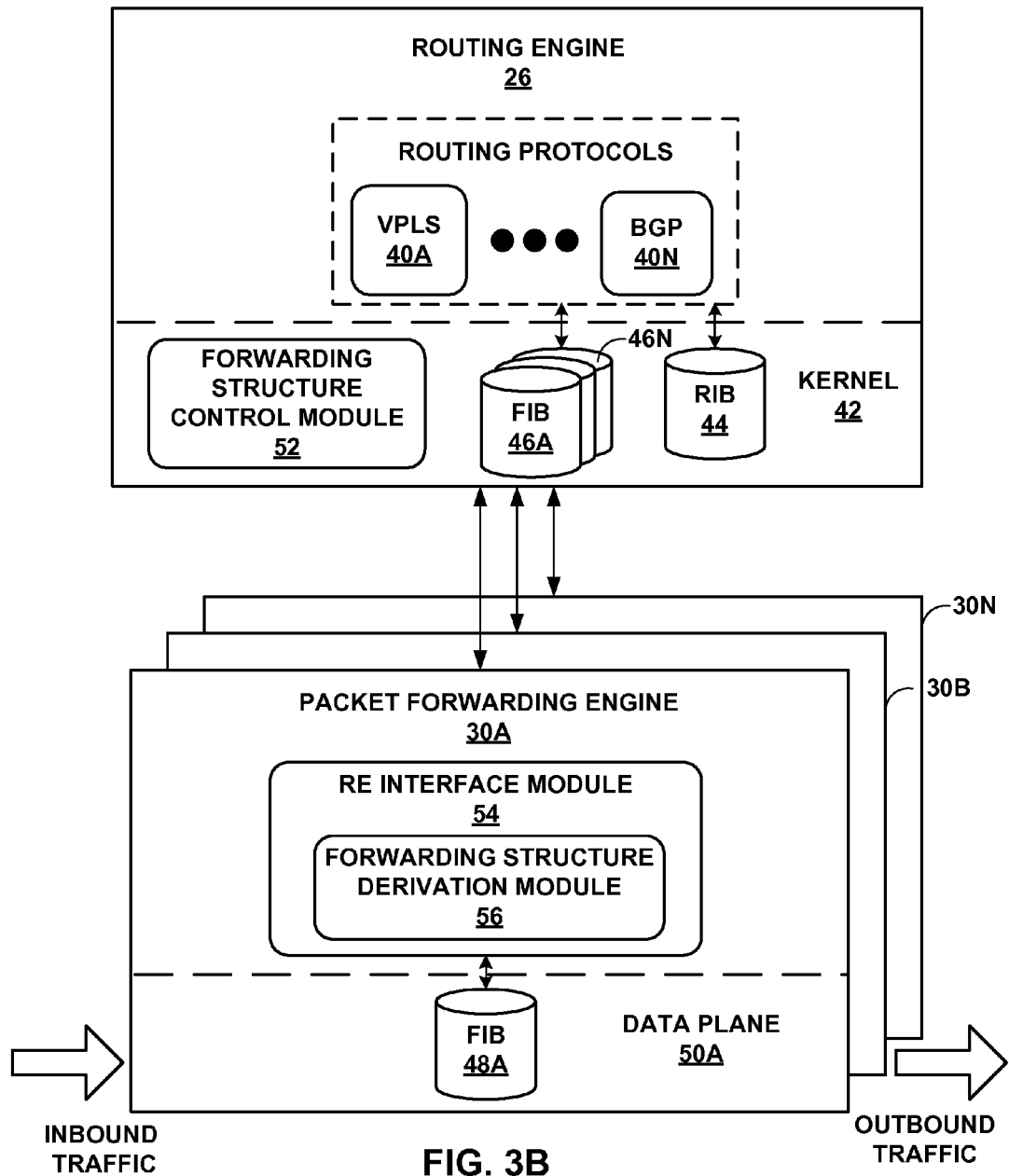

FIGS. 3A-3B are block diagrams illustrating routing engine 26 and packet forwarding engine 30A of routing node 10 of FIG. 2 in further detail. Routing engine 26 includes high-level, control plane routing protocols 40A-40N ("routing protocols 40"). In the example of FIGS. 3A and 3B, routing protocols 40 include VPLS 40A and BGP 40N. Routing engine 26 may include other routing protocols not shown in FIGS. 3A and 3B. Routing protocols 40 interact with kernel 42 to update routing information base (RIB) 44 based on routing protocol messages received by routing node 20. In response, kernel 42 generates forwarding information in the form of FIBs 46A-46N based on the network topology represented in RIB 44. Kernel 42 then programs PFEs 30 to install copies of the FIBs as FIBs 48A-48N within their respective data plane 50, i.e., packet forwarding components having specialized forwarding chipsets.

As described above, PFE 30A may comprise a first-generation chipset that requires that installed forwarding information specify the particular plurality of next hops to which to flood copies of received packets. That is, PFE 30A may not support use of flooding next hop identifiers and may not be capable of deriving the plurality of next hops to which to flood the copies of the packet on-the-fly from a single flooding next hop that represents all of the next hops within the L2 network. In this case, routing engine 26 programs PFE 30A to store FIB 48A. FIB 48A includes forwarding information describing interfaces and corresponding next hops to which packets received on the interfaces should be forwarded.

Although PFE 30A is not capable of deriving the plurality of next hops to which to flood the copies of the packet from a single flooding next hop that represents all of the next hops within the L2 network, the techniques of the invention nonetheless allow routing node 20 to set up split-horizon flooding next hops for PFE 30A based on the single flooding next hop. The split-horizon flooding next hops identify a set of next hops to which a packet should be flooded when the packet is received on a given interface and when the destination address of the packet is unknown to routing node 20, where the set of next hops conforms to the split-horizon rule (i.e., the set does not include the next hop corresponding to the ingress interface of the packet).

In one embodiment illustrated by FIG. 3A, the lower-level of control plane of routing engine 26 (i.e., forwarding structure control module 52) handles derivation of the split-horizon flooding next hops during derivation. That is, kernel 42 includes a kernel-level forwarding structure control module 52 that is transparent to routing protocols 40 and other high-level, control plane software executing above kernel 42. After route resolution and prior to installation of FIBs 46 within PFEs 30, kernel 42 invokes forwarding structure control module 52 to transparently modify FIBs 46 as necessary based on the capabilities of the underlying PFEs 30. In this way, routing protocols 40 and kernel 42 may still utilize the logical construct of the flooding next hop identifier even when such a construct is not directly supported by the underlying hardware components of one or more of PFEs 30.

When invoked, forwarding structure control module 52 processes the forwarding information within FIBs 46 to replace the flooding next hop identifiers as necessary. For example, for each flooding next hop, the forwarding structure control module 52 may first determine the next hop that corresponds to the respective input interface using an index assignment based on the one-to-one relationship between elemental unicast next hops (as opposed to flooding next hops) and interfaces. For example, the one-to-one relationship may be as follows:

$$\begin{cases} I_1, N_1 \\ I_2, N_2 \\ I_3, N_3 \\ I_4, N_4 \end{cases}.$$

Thus, there is a duality between interfaces and next hops in that what is modeled as an interface on packet ingress is modeled as a next hop on packet egress. In other words, each interface $I_i$ denotes an ingress port for which $N_i$ is the corresponding egress port.

For a set of interfaces $I=\{I_1, I_2, \ldots, I_n\}$ involved in a flooding list, the order of the interfaces I is known to the control and data planes. Alternatively, since each of the interfaces is a logical port, they are also each assigned an integer value and thus the set $\{I_1, I_2, \ldots, I_n\}$ can be sorted to reach a unique ordered list, $I'=\{I'_1, I'_2, \ldots, I'_n\}$. Due to the duality of interfaces and unicast next hops, this list $I'=\{I'_1, I'_2, \ldots, I'_n\}$ corresponds in a one-to-one manner with the list of unicast next hops $N'=\{N'_1, N'_2, \ldots N'_n\}$.

Forwarding structure derivation module 56 then derives the set of split-horizon flooding next hops for each interface by removing the next hop that corresponds to the ingress interface (i.e., generating exclusion routes for each interface). For example, forwarding structure control module 52 drops the next hop at rank "k" from the list N when formulating the split-horizon flooding next hop for an interface $I_k$:

$$\begin{cases} I_1 \rightarrow \{N_2, N_3, N_4\} \\ I_2 \rightarrow \{N_1, N_3, N_4\} \\ I_3 \rightarrow \{N_1, N_2, N_4\} \\ I_4 \rightarrow \{N_1, N_2, N_3\} \end{cases}.$$

Forwarding structure control module 52 may insert the complete list of next hops for which to flood traffic for each ingress interface. Alternatively, forwarding structure control module 52 may produce additional forwarding information storing the derived list of split-horizon flooding next hops and replace the flooding next hop label with a new label $N_{F1}$-$N_{F4}$ mapped to the respective list split-horizon flooding next hops:

$$\begin{cases} I_1 \rightarrow \{N_2, N_3, N_4\} = N_{F1} \\ I_2 \rightarrow \{N_1, N_3, N_4\} = N_{F2} \\ I_3 \rightarrow \{N_1, N_2, N_4\} = N_{F3} \\ I_4 \rightarrow \{N_1, N_2, N_3\} = N_{F4} \end{cases}.$$

Forwarding structure control module 52 then updates FIBs 46 as necessary based on the capabilities of the underlying PFEs 30, i.e., their ability to support flooding next hop identifiers. Kernel 42 then installs FIBs 48 to PFEs 30. In this manner, routing protocols 40 need not maintain the routing information of RIB 44 to expressly generate and store all of the exclusion routes to which to flood L2 network traffic.

Where routing node 20 has multiple PFEs 30, PFEs 30 may need to agree on the indices of the split-horizon flooding next hops across PFEs 30. When the derivation of split-horizon flooding next hops is performed within routing engine 26, forwarding structure control module 52 may rank the interfaces and corresponding next hops as described above (e.g., by interface number or port number) to ensure that all of PFEs 30 agree about specific split-horizon flooding next hops and their index assignments.

In other embodiments, the packet forwarding functionality may be distributed among interface cards (IFCs) 31 and 32 (FIG. 2). In this case, routing engine 26 may similarly perform the split-horizon flooding next hop derivation, and provide the flooding next hops to packet forwarding components in each of IFCs 31, 32.

After the split-horizon flooding next hops are generated and installed within PFEs 30, data planes 50 of routing node 20 (e.g., data plane 50A of PFE 30A) may receive a L2 VPLS packet having a destination address that routing node 20 has not yet learned. For example, routing node 20 may receive the packet via an interface of PFE 30A. PFE 30A references FIB 48A using the interface as a key to obtain a split-horizon flooding next hop identifier and obtain a list of the next hops associated with the split-horizon flooding next hop identifier, and floods the L2 VPLS packet to all of the distinct next hops associated with the split-horizon flooding next hop. In this manner, routing node 20 may avoid loops in the forwarding plane by following the split-horizon rule, even where one or more of PFEs 30 includes a first-generation chipset.

In some embodiments, routing node 20 may additionally include second- or third-generation packet forwarding engine technology. For example, one or more of PFEs 30 may comprise PFE chipsets capable of identifying the interface from which a packet ingressed, on-the-fly prior to flooding the packet, and removing the next hop associated with the interface from the set of next hops to which the packet is flooded. Thus, different PFEs 30 of routing node 20 may apply different techniques for split-horizon flooding. Forwarding structure control module 52 of routing engine 26 may provide FIBs 48A-48N that are tailored to the requirements of respective PFEs 30A-30N. For example, where PFE 30A is a first-generation chipset and PFE 30N is a third-generation chipset, routing engine 26 may generate FIB 48A differently than FIB 48N according to the specific split-horizon next hop functionality of the FIBs 48. The techniques of the invention may allow routing node 20 to present a unified, seamless abstraction of split-horizon flooding such that routing protocols 40 are unaware of the different flooding techniques being used at the packet forwarding level. This may be easier to program to, and may allow for better scaling when interfaces fail, join, or leave the VPLS domain.

An alternative embodiment in which PFE 30A internally derives the split-horizon flooding next hops will now be described with respect to FIG. 3B. Forwarding structure derivation module 54 of PFE 30A may operate as a 'slave' forwarding structure control module based on information provided by the 'master' forwarding structure control module 52 of routing engine 26. Forwarding structure derivation module 56 of PFE 30A may obtain routes and next hops from forwarding structure control module 52 of routing engine 26, e.g., via FIB 46A. For example, forwarding structure derivation module 56 may obtain the following routes and next hop information from FIB 46A:

$$\begin{cases} I_1 \rightarrow FNH\{SH\} \\ I_2 \rightarrow FNH\{SH\} \\ I_3 \rightarrow FNH\{SH\} \\ I_4 \rightarrow FNH\{SH\} \end{cases} \text{ and } FNH = \{N_1, N_2, N_3, N_4\},$$

where $I_1$-$I_4$ are interfaces of PFE 30A having indices 1-4, and where FNH is a flooding next hop that represents the set of $N_1$-$N_4$ individual distinct next hops, and where {SH} is a next hop action identifier that specifies the requirement that the next-hops should conform to the split-horizon rule. Alternatively, the information obtained from FIB 46A may be expressed as follows:

TABLE 1

| Routes | NHs | NH Action Identifier |
|---|---|---|
| $\{I_1, I_2, I_3, I_4\}$ | {FNH} | {SH} | depending on the details of the implementation.

As above, the flooding next hops FNH for each interface do not conform to the split-horizon rule, because each flooding next hop FNH includes the next hop corresponding to the ingress interface. In this embodiment, forwarding structure derivation module 56 of PFE 30A is able to derive the set of split-horizon flooding next hops for each of interfaces $I_1$-$I_4$ based on this information received from forwarding structure control module 52 of routing engine 26.

Forwarding structure derivation module 56 ranks the next hop that corresponds to each interface based on the one-to-one relationship between the next hops and interfaces by index. Forwarding structure derivation module 56 then derives a split-horizon flooding next hop for each interface by removing the next hop that corresponds to the ingress interface from the set of next hops of $N_F$ (i.e., generating exclusion routes for each interface). Forwarding structure derivation module 56 may update FIB 48A as necessary to store the derived split-horizon flooding next hop for each interface. Each of PFEs 30 that comprises a first-generation chipset may include a corresponding 'slave' forwarding structure derivation module that receives information from 'master' forwarding structure derivation module 52 and operates accordingly to internally derive split-horizon flooding next hops for the respective ones of PFEs 30. In addition, forwarding structure control module 52 may generate FIBs 48 differently depending on the type of chipset included within PFE 30.

Forwarding structure derivation module 56 may obtain indices for the new split-horizon flooding next hops. The indices of the new split-horizon flooding next hops may have to be consistent across all of PFEs 30. This may be achieved in a variety of ways. Each of the PFEs 30 can follow the process described above to generate the same exclusion lists, but the PFEs 30 need to agree on the next hop indices $N_{Fn}$ assigned to the lists. As one example, forwarding structure derivation module 56 within one of PFEs 30 may do an upcall to forwarding structure control module 52 within kernel 42 of routing engine 26 to request that an index be assigned for one or more derived split-horizon flooding next hop lists (e.g., $\{N_1, N_2, N_3\}$). When forwarding structure control module 52 receives such a request for a split-horizon flooding next hop list for the first time, forwarding structure control module 52 allocates an index (e.g. NF4) and forms a cache of the corresponding mapping of list to index. When any other PFE 30 asks for an index for split-horizon flooding next hop list for which an entry is already present in the cache (i.e., another PFE 30 has already asked for an index for that list), forwarding structure control module 52 refers to the cache and returns the index for that split-horizon flooding next hop list according to the mapping. In this manner, when forwarding structure control module 52 has seen the same split-horizon flooding next hop before, forwarding structure control module 52 assigns the same index as was assigned before. If forwarding structure control module 52 has not seen the split-horizon flooding next hop before, forwarding structure control module 52 assigns a new index. This ensures that all of PFEs 30 have the same value for the next hop indices for split-horizon flooding.

As another example, PFEs 30 may include a master PFE 30 that assigns the indices and keeps track of the assignments across all of PFEs 30. As a further example, PFEs 30 may exchange information and assign indices based on a distributed consensus protocol among the PFEs 30. As another example, forwarding structure control module 52 may drive the mapping of split-horizon next hop lists to indices into PFEs 30. However, with this method, forwarding structure control module 52 needs to know the specifics of the PFEs 30 (i.e., which can do split-horizon flooding natively, which cannot).

After the split-horizon flooding next hops are derived and assigned indices, RE interface module 54 may provide the new split-horizon flooding next hops to forwarding structure control module 52 of routing engine 26. Forwarding structure control module 52 updates the routes within RIB 44 and generates new FIBs 46 as necessary. The updated routes map each of the interfaces to the respective derived split-horizon flooding next hop, as opposed to associating all of the interfaces with the same flooding next hop. In this manner, the routing engine need not store all of the exclusion routes. Forwarding structure control module 52 installs FIBs 48 to PFEs 30 in accordance with FIBs 46.

As another example, the split-horizon flooding next hop derivation described above may be performed by forwarding structure control module 52 in kernel 42 of routing engine 26. Since routing engine 26 is a central node with respect to each of PFEs 30, forwarding structure control module of routing engine 26 may keep track of which indices are provided for each flooding next hop.

Figure 4A:
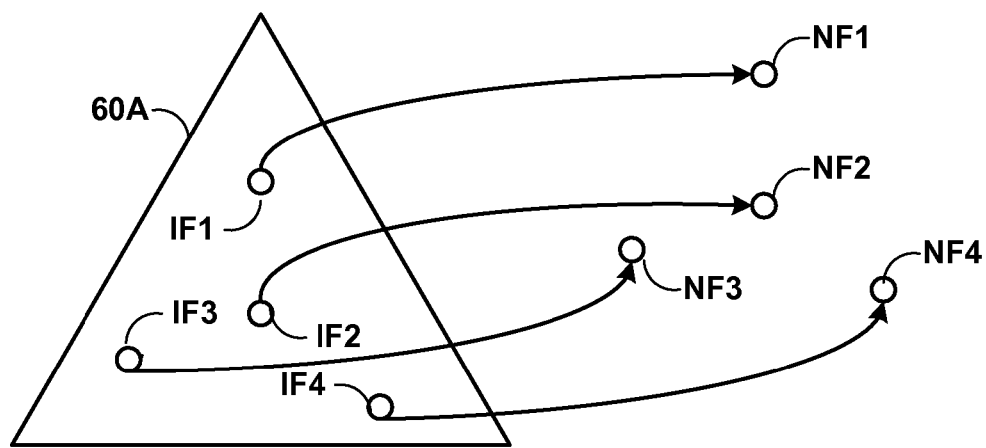
FIGS. 4A-4B are block diagrams illustrating forwarding information bases (FIBs) maintained by packet forwarding engines in the form of radix trees.
Figure 4B:
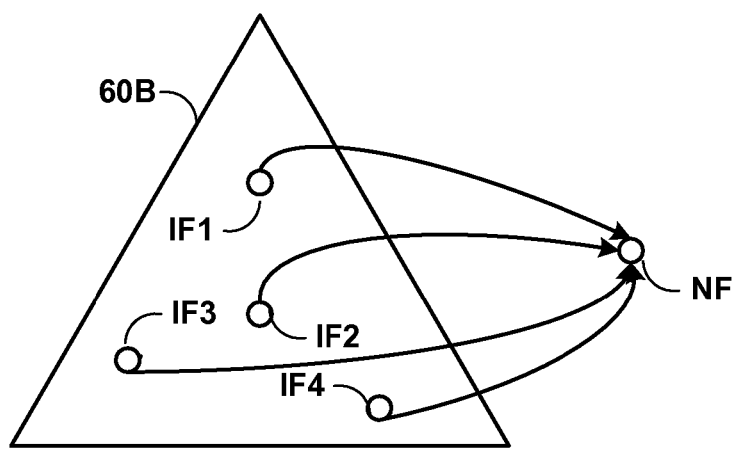

FIGS. 4A-4B are block diagrams illustrating example forwarding information bases (FIBs) 60A and 60B maintained by PFEs 30 in the form of radix trees. FIB 60A of FIG. 4A is a representation of a FIB that may be generated and installed within a PFE having a first-generation chipset (e.g., PFE 30A), and FIB 60B is a representation of a FIB that may generated and installed within in a second- or third-generation chipset (e.g., PFE 30N). FIBs 60A-60B includes forwarding information for each interface of PFEs 30A and 30N by identifying next hop(s) to which a packet received on the respective interface should be forwarded. For example, nodes of the radix tree of FIB 60A have been generated to include data specifying split-horizon flooding next hop identifiers NF1-NF4:

$$\begin{cases} I_1 \rightarrow NF1 \\ I_2 \rightarrow NF2 \\ I_3 \rightarrow NF3 \\ I_4 \rightarrow NF4 \end{cases},$$

where NF1-NF4 correspond to split-horizon flooding next hop exclusion lists as described above (e.g., $\{N_1, N_2, N_3\}$).

In addition, FIB. 60A has been generated to include data external to the radix tree that stores the specific next hops to which to flood packets. That is, the pointer for the node associated for the first interface $I_1$ includes the split-horizon flooding next hop identifier NF1, which points to a data set specifying next hops {NH2, NH3 and NH4}. In this manner, the forwarding information of FIB 60A includes all information for split-horizon flooding without placing any burden on the PFE for on-the-fly derivation.

In contrast, FIB 60B utilizes flooding next hop identifiers. In this case, the nodes of the radix tree corresponding to all interfaces $I_1$-$I_4$ include a single flooding next hop identifier FNH to logically represent that L2 traffic for those interfaces is to be flooded on the corresponding L2 network:

$$\begin{cases} I_1 \rightarrow FNH \\ I_2 \rightarrow FNH \\ I_3 \rightarrow FNH \\ I_4 \rightarrow FNH \end{cases}.$$

Thus, FIB 60B may utilize fewer identifiers and occupy less memory resources. Moreover, the routing protocols and other higher-level software of the routing engine need not be configured to handle the complexities of generating the routing and forwarding information in compliance with the split-horizon requirements. When forwarding traffic, the PFE using second-generation chipsets processes FIB 60B on-the-fly to (i.e., at the time of forwarding traffic) to derive the specific next hops to which to flood the traffic.

Figure 5:
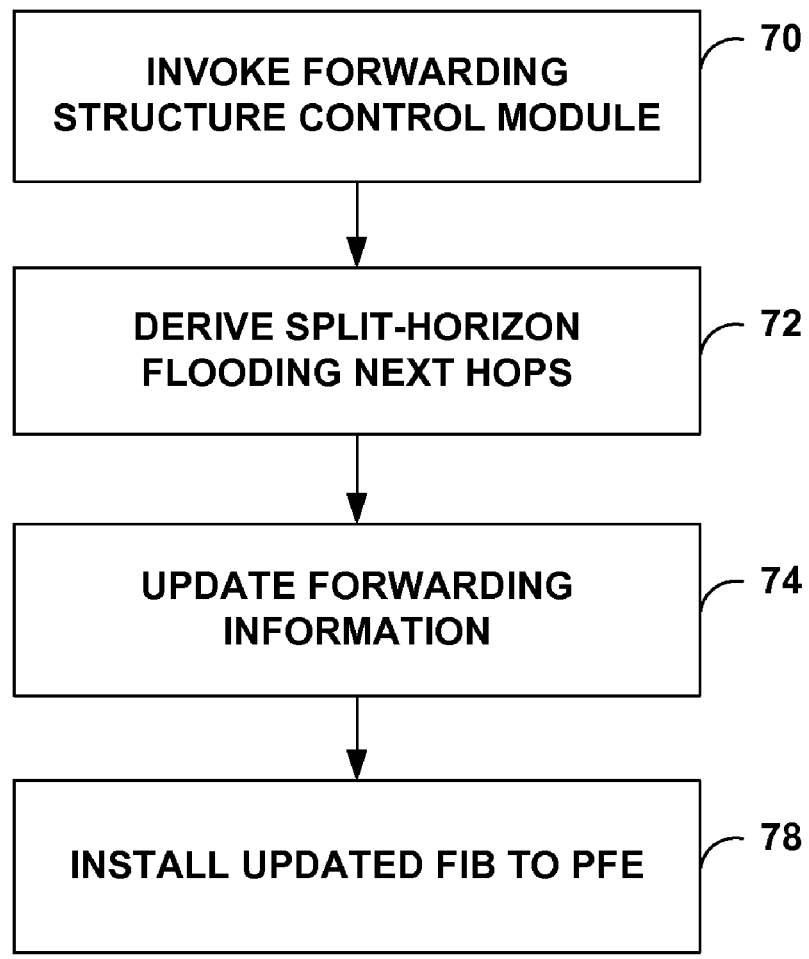
FIG. 5 is a flow chart illustrating example operation of a PFE and a routing engine of a routing node.

FIG. 5 is a flowchart illustrating example operation of PFE 30A and routing engine 26 of routing node 20. In this example, PFE 30A comprises a first-generation chipset that requires that installed forwarding information specify a plurality of next hops to which to flood copies of received packets, and is not capable of deriving the plurality of next hops to which to flood the copies of the packet from a single flooding next hop identifier that represents all of the next hops within the L2 network. Although PFE 30A lacks hardware support for deriving the plurality of next hops to which to flood the copies of the packet from a single flooding next hop that represents all of the next hops within the L2 network, the techniques of the invention nonetheless allow PFE 30A to set up split-horizon flooding next hops.

As described above, the split-horizon flooding next hops may be derived at the control plane of routing engine 26, or internal to PFEs 30. For purposes of example, FIG. 5 will be described with respect to the embodiment in which the derivation is performed at the control plane of routing engine 26. After route resolution and prior to installation of forwarding information within the underlying PFEs, kernel 42 seamlessly invokes forwarding structure control module 52 to process and modify FIB 46A based on the capabilities of PFE 30A (70). As discussed, a one-to-one relationship exists between the interfaces and the elemental unicast next hops. Based on this information, forwarding structure control module 52 of routing engine 26 processes the forwarding information to identify any use of flooding next hop identifiers, performs flood list expansion to logically expand the flooding next hop identifiers maintained by the high-level control plane software into the complete list of next hops within the L2 network, and derives the particular split-horizon flooding next hops to exclude a next hop associated with the input interface (72). For example, forwarding structure control module 52 determines a next hop that corresponds to each interface based on the one-to-one relationship. Forwarding structure control module 52 then derives a split-horizon flooding next hop for each interface by removing the next hop that corresponds to the ingress interface from the set of next hops of the flooding next hop identifier.

Forwarding structure control module 52 may then modify the forwarding information to replace the flooding next hop identifier with the full, derived list of split-horizon next hops (74). Alternatively, forwarding structure control module 52 may modify the forwarding information to replace each flooding next hop identifier with a corresponding split-horizon flooding next hop identifier that indexes a list of the particular split-horizon next hops stored external to the radix tree. Forwarding structure control module 52 then communicates FIBs 48 to RE interface module 54 for installation within the respective data plane 50 of PFEs 30 (78).

After the split-horizon flooding next hops are generated and installed within PFEs 30, routing node 20 may receive a L2 VPLS packet having a destination address that routing node 20 has not yet learned. For example, routing node 20 may receive the packet via an interface of PFE 30A. PFE 30A references FIB 48A using the interface as a key to obtain the split-horizon flooding next hop, and floods the L2 VPLS packet to the split-horizon flooding next hop. In this manner, routing node 20 may avoid data loops in the forwarding plane by following the split-horizon rule, even where one or more of PFEs 30 includes a first-generation chipset.

As another example, the techniques described herein may also apply to programming the PFE with rewrites to packet headers of received packets. This is another situation in which different types of underlying hardware platforms of PFEs 30 may have different capabilities that need to be taken into account for programming the PFEs with forwarding structures.

Figure 6:
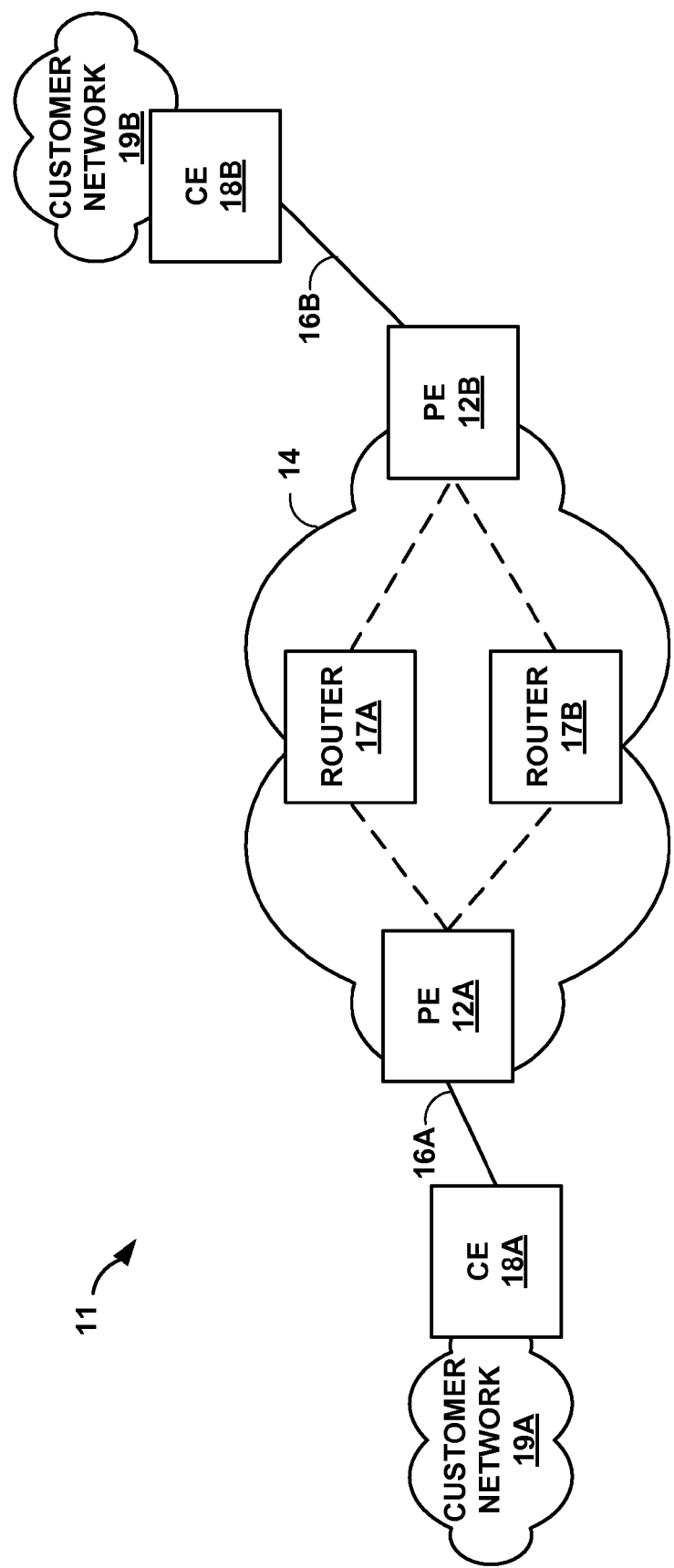
FIG. 6 is a block diagram illustrating an example system in which a provider edge device sends packets to another provider edge device on one or more label switched paths (LSPs) between the two provider edge devices.

FIG. 6 is a block diagram illustrating an example system 11 in which PE 12A sends packets to PE 12B on one or more label switched paths (LSPs) between PE 12A and PE 12B. The LSPs may be established through intermediate router 17A and intermediate router 17B, respectively. PE 12A receives packets having a header portion and a payload portion. The header of the packet can be said to "encapsulate" the payload. In some cases, PE 12A may be required to rewrite the header of the received packets and output the packet with the rewritten header to a destination, such as to PE 12B. The headers of the packets may consist of multiple portions, e.g. a label stack or layer-two encapsulation. Thus, in this example, the rewrite of the header by PE 12A may be a large rewrite composed of sub-parts and must be performed for each packet. This is discussed in further detail below.

Figure 7:
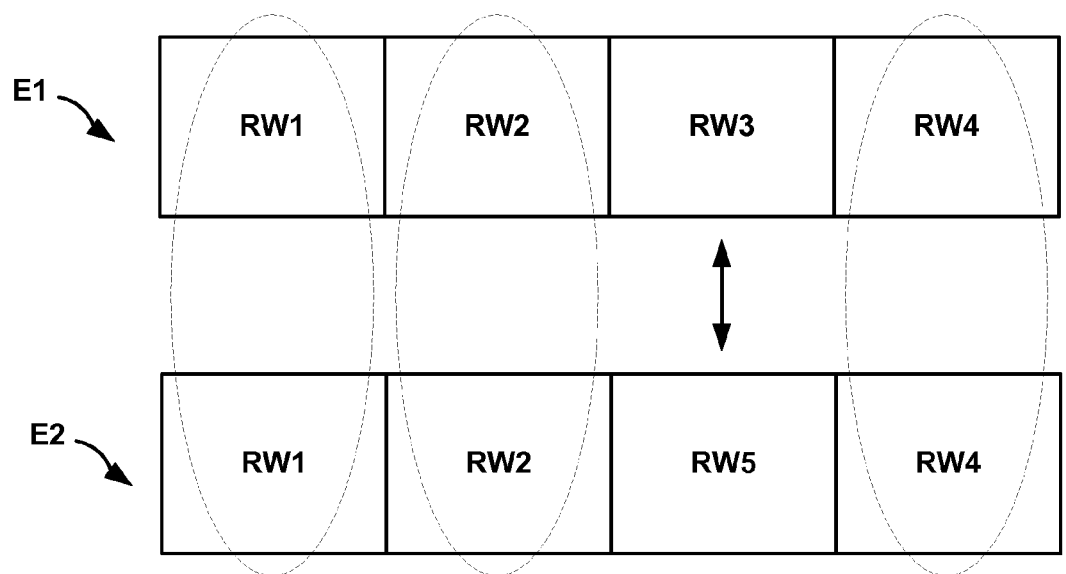
FIG. 7 is a block diagram illustrating two example packet header rewrites.

FIG. 7 is a block diagram logically illustrating two example packet header rewrites, which are each referred to as "entireties," that may be required when forwarding certain packets. Entirety E1 and Entirety E2 are made up of individual rewrites to several different portions of the packet header, i.e., RW1-RW4 for E1 and RW1, RW2, RW5, and RW4 for E2. As a practical example, RW1 may be a L2 Ethernet header, RW2 may be a L2 PPP header, and RW 3, RW4, and RW5 may be MPLS labels. PFEs 30 (FIGS. 3A and 3B) may store required packet header rewrites as forwarding structures in stored FIBs. The forwarding structures may associate the packet header rewrites with destination routes. As described below, E1 and E2 may be composed of individual strings for each rewrite that are concatenated together, or may be written as a single string, i.e., a single next hop chain.

Figure 8:
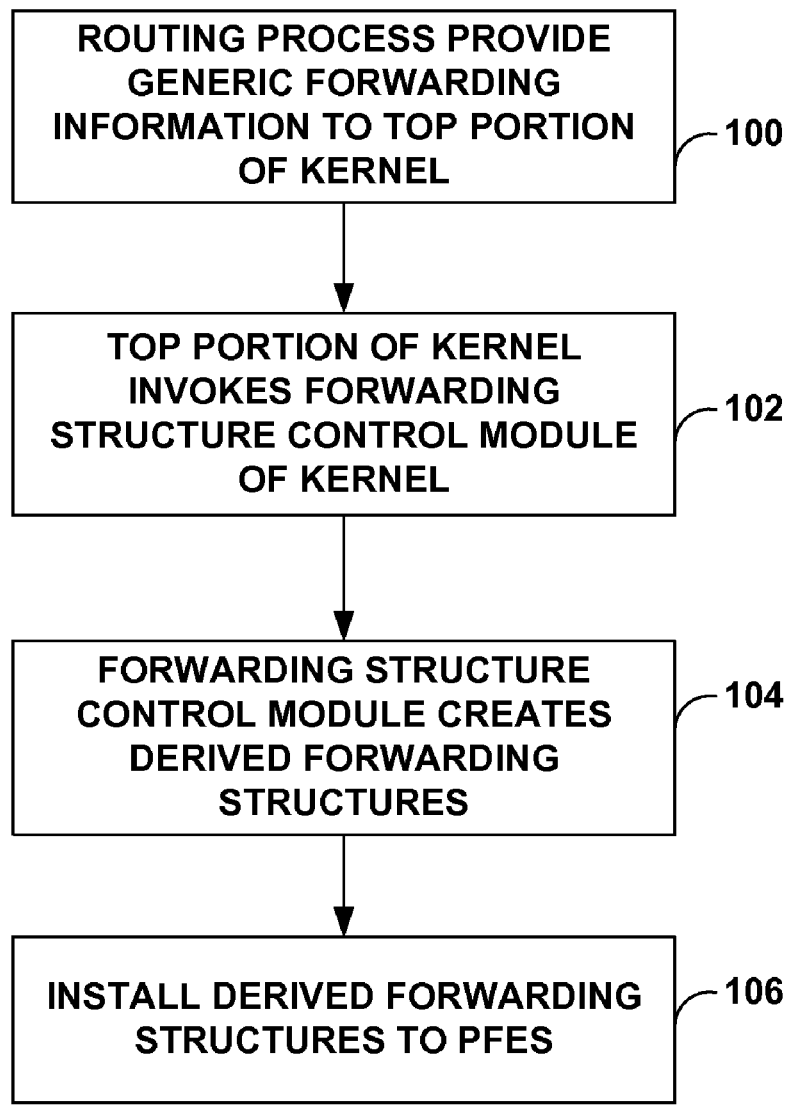
FIG. 8 is a flowchart illustrating one example operation of a routing node.

FIG. 8 is a flowchart illustrating one example operation of a routing node, e.g., routing node 26 of FIG. 3A. A routing software process or other software module executing within an operating environment provided by an operating system of routing engine 26 may provide generic forwarding information to a top portion of kernel 46 to be installed in the forwarding plane, e.g., to FIBs of PFEs 30 (100). For example, the routing process may tell kernel 42 that for IP routes (i.e., destinations) having a particular IP prefix, the associated next hop consists of a set of rewrites that should be concatenated together in encapsulating the payload of the packet. This operation is referred to as "next hop chaining" The generic forwarding information for the forwarding plane that the routing process provides to kernel 42 may be expressed as follows:

TABLE 2

| Routes | NHs | NH Action Identifier |
| --- | --- | --- |
| {IP prefix} | {RW1, RW2, RW3, RW4} | {Chain} |

These abstract instructions state that for particular routes, e.g., as expressed by an IP prefix, certain rewrites should be applied to the packet headers for sending the packets out to the appropriate next hops. The NH action identifier identifies that the action of "next hop "chaining" should be applied, i.e., each of the header elements (e.g., labels) should be applied on the packet in an encapsulation chain. In other words, the individual rewrite elements listed as NHs should be chained together (e.g., in a single string) and recognized as a single next hop in the FIB. The routing process may create different generic forwarding structures for installation in the FIBs of the different PFEs based on the next hops associated with the PFEs. The routing process may communicate the generic forwarding structures to an operating system of the routing node, e.g., to a top portion of kernel 42.

The top portion of kernel 42 receives this generic forwarding structures from the routing process, invokes forwarding structure control module 52, and communicates the generic forwarding structures to forwarding structure control module 52 (102). In one embodiment, forwarding structure control module 52 operates as a "shim layer" in the lower layers of kernel 42 to formulate the derived next hops to be installed in the forwarding plane, i.e., in the PFEs for use during packet forwarding, based on the generic forwarding structures received from the routing process (104). In so doing, forwarding structure control module 52 is aware of the underlying architecture of PFEs 30 and the capabilities of each of PFEs 30.

In some situations, a change to the topology of service provider network 14 may require a change to the packet header associated with a given route, but this change may be limited to only certain portions of the packet header rewrite while the rest of the rewrites remain the same. One practical example where this may occur is with MPLS fast reroute, where the PFE FIB may be programmed with a backup LSP for use if a primary LSP fails. One example of this situation is illustrated in FIG. 6, which shows E2, a new entirety that replaces E1, such as for a fast reroute backup. However, the change from E1 to E2 only requires that the portion RW3 be replaced with RW5, while all of the other rewrites remain the same. Second- or third-generation chipsets may be capable of updating the one changed rewrite portion of the header "on the fly" should a fast reroute occur, without having to re-generate the entirety of the header chain. The second- or third-generation chipsets need only be programmed with forwarding information having a single instantiation (E1) consisting of substrings with indices that then can be individually indirectly updated on the fly. First-generation chipsets may not have this capability, but instead require that the entire header chain be re-generated. Thus, first-generation chipsets require that installed forwarding information specify two separate instantiations of the entirety (E1 and E2), and may require the installed next hops to be created by making a string of the labels and concatenating the string.

In operation, forwarding structure control module 52 operates as a transparent intermediate control module that takes into account the type of chipset associated with each of PFEs 30 when creating the rewrite entireties (i.e., derived forwarding structures) to be installed within each of the PFEs 30. Thus, for a PFE 30 having a first-generation chipset, forwarding structure control module 52 may install to the FIB of this PFE 30 both E1 and E2 as distinct instantiations, e.g., as primary and backup rewrite entireties. In contrast, for a PFE 30 having a second-generation chipset, forwarding structure control module 52 may install E1 to the FIB of this PFE 30 as a single next hop chain, since forwarding structure control module 52 is aware that this particular PFE is capable of supporting next hop chaining and rewriting just the particular portion of E1 that needs to change in the event of a fast reroute. In this way, the techniques of the invention relieve the routing processes executing above the operating system of the network device of the burden of tailoring the forwarding structures to the specifics of the forwarding plane platforms, and instead allow the routing processes to maintain generic forwarding information without regard to the limitations of the underlying forwarding plane architecture. Thus, routing protocols 40 may create a generic forwarding structure even when the abstract construct used by routing protocols 40 is not supported by one or more of PFEs 30.

Figure 9:
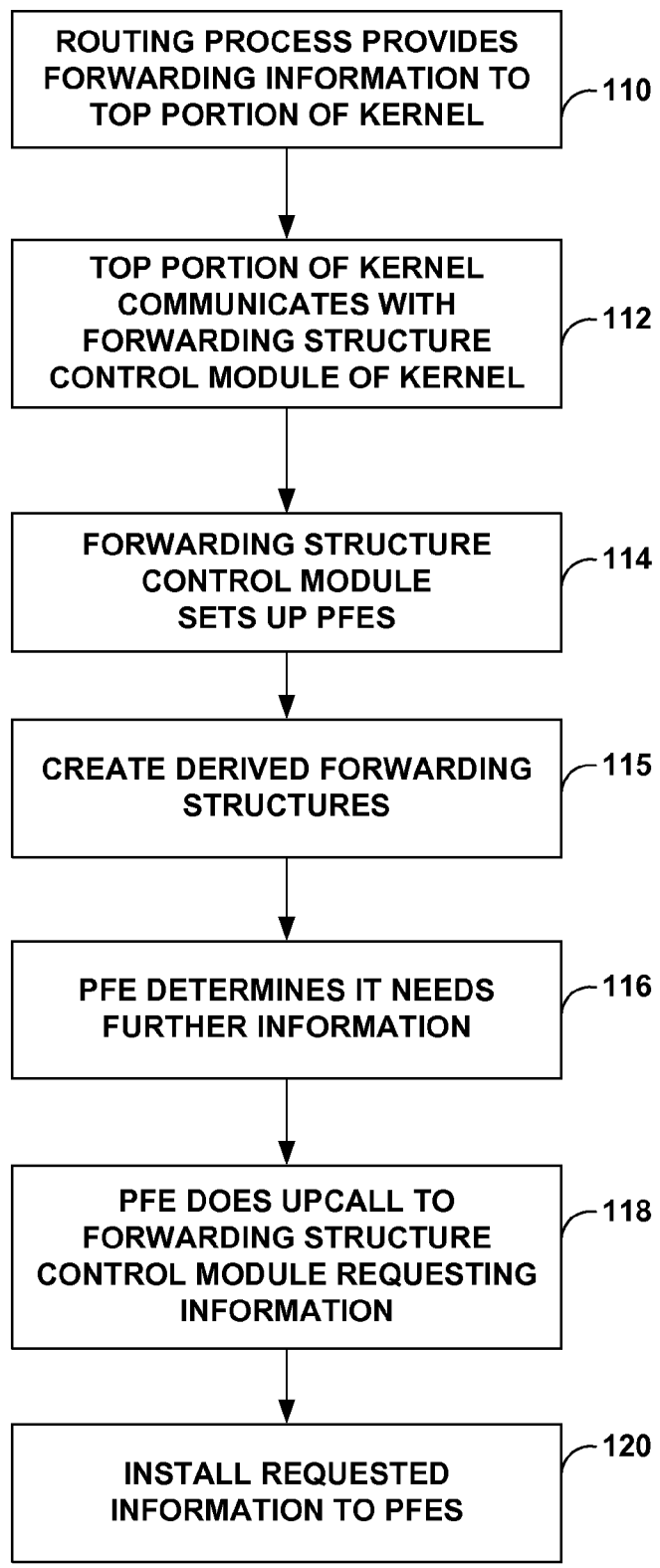
FIG. 9 is a flowchart illustrating example operation of a routing node in accordance with another embodiment of the invention.

FIG. 9 is a flowchart illustrating example operation of a routing node such as routing node 26 of FIG. 3B in accordance with another embodiment of the invention. In a similar manner as described above, a routing process executing above an operating system of the routing node may provide generic forwarding information that conforms to an abstraction of the forwarding structures to a top portion of kernel 46 (110). The routing process may provide forwarding information that specifies that for IP routes having a particular IP prefix, the associated next hop consists of a set of rewrites that should be chained together in encapsulating the payload of the packet.

A top portion of kernel 42 receives this generic forwarding information from the routing process, and invokes forwarding structure control module 52 (112). Forwarding structure control module 52 generally sets up the PFEs 30 by installing a FIB into each of PFEs 30 to control forwarding of traffic within the data plane (114). The FIB installed by forwarding structure control module 52 may consist of generic forwarding structures that do not necessarily conform to requirements of the underlying forwarding plane architecture. Based on the FIB created by the control plane, PFEs 30 create derived forwarding structures (115). In this embodiment, each PFE 30 is responsible for determining what information it may additionally need for updating its FIB, based on its known type of underlying forwarding architecture (116). For example, forwarding structure derivation module 56 of a first-generation PFE 30 may create a derived E1 and E2 and install them in its own FIB. RE interface modules 54 of the PFEs 30 may individually do upcalls to forwarding structure control module 52 of kernel 42 to obtain other needed information, such as indices for the entireties or other information (118). In response to the upcall, forwarding structure control module 52 installs the requested information to the requesting PFEs 30 (120). Forwarding structure control module 52 keeps track of the information requested and provided to the requesting PFEs 30. In this manner, forwarding structure control module 52 may manage the dissemination of information across PFEs 30 and ensure that no conflicting or overlapping assignment of information (e.g., indices for the forwarding structures) is made. In this way, PFEs 30 all agree on details of their forwarding information such as indices. The routing node may then process received packets in accordance with the installed derived forwarding structures. The processing of the packets may take many forms. For example, the routing node may forward the packets. In some cases, the routing node may apply firewall actions to the packet, or may apply services to the packet such as network address translation (NAT), anti-virus (AV) scanning and detection, intrusion detection protection (IDP) and/or any other services. Other examples of processing that may be applied based on the installed derived forwarding structures include accepting the packet at a routing engine of the network device, or discarding the packet.

Referring again to FIG. 6, suppose the path from CE 18A to PE 12A through router 17A and PE 12B to CE 18B is the primary path and CE 18A to PE 12A through router 17B and PE 12B to CE 18B is the secondary path. In this case, the rewrites impinged on the packet at PE1 may be:
A) Encapsulation rewrite for path through router 17A:
{VPN label,
MPLS LSP label for PE 12A-router 17A,
L2 encapsulation for PE 12A-router 17A}
B) Encapsulation rewrite for path through router 17B:
{VPN label
MPLS LSP label for PE 12A-router 17B,
L2 encapsulation for PE 12A-router 17B}
This could be represented as:

TABLE 3

| Routes | NH |
|---|---|
| {Packet's IP prefix} | Unilist(NH-chain {VPN, LSP_PE 12A_router 17A, L2_PE 12A_router 17A}, {VPN, LSP_PE 12A_router 17B, L2_PE 12A_router 17B}) |

In other words, a next hop chain function is formed (which concatenates a set of given rewrite sub-strings, and forms a larger rewrite string) consisting of the sub-strings in the cases (A) and (B) above. In the primary/backup case, the unilist would be set up as "have the primary with a low weight, and the backup with a higher weight, so that the primary path is taken."

In an alternative embodiment, PE 12A may use equal cost multipath techniques to send the packets through both router 17A and router 17B to increase effective bandwidth, all the while ensuring that packets with the same flow follow the same path. In this case, the two members of the unilist next hop would have equal weights, so that both paths are taken.

If a second- or third-generation PFE is able to understand and formulate next hop chains, it would take the above formulation, and natively implement it in the packet rewrite path in the data plane. If an earlier generation PFE is incapable of forming chains, the following additional next hops would have to be derived to aid the earlier generation PFE:

TABLE 4

| Derived Next Hop | Derived NH index |
|---|---|
| Concatenate(VPN, LSP_PE 12A_router 17A, L2_PE 12A_router 17A) | DN_1 |
| Concatenate(VPN, LSP_PE 12A_router 17B, L2_PE 12A_router 17B) | DN_2 |

And the routes in the data plane of such a PFE would then be made to point to the following:

TABLE 5

| Routes | NH |
|---|---|
| {Packet's IP prefix} | Unilist(DN_1, DN_2) |

Another example of next hop chaining in which the techniques described herein may be applied is the case of per-prefix labels: for each IP prefix behind a CE device, the PE (PE 12B, for instance) advertises a different label to its peer PE (PE 12A in this case). There would be a plethora of VPN labels, which would result in inefficient use of PFE resources. So, next hop chaining is used to "factor out" the common parts of the next hop rewrites, as follows:

TABLE 6

| Routes | NH | |
|---|---|---|
| {IP prefix1} | VPN-label_1 | |
| {IP Prefix2} | VPN-label_2 | |
| ... | ... | |
| {IP prefix_i} | VPN-label_i | LSP_PE 12A_router 17A-label, L2_PE 12A_router 17A |
| ... | ... | |
| {IP prefix_n} | VPN-label_n | |

In other words, each route points to a "chain" of sub-rewrites: the appropriate VPN label is added first, then the (common) LSP label is added after which the (common) layer-2 encapsulation is added. This is an efficient model for the control plane to deal with, for reasons of scaling. The first part of each next hop chain is a VPN label that is specific to an IP prefix. The particular next hop chain is chosen by lookup of the appropriate prefix. For example, if the LSP flaps, only a small amount of state needs to be updated, and there is no replication of the state "LSP_PE 12A_router 17A-label, L2_PE 12A_router 17A" in the PFE for each NH, which results in space saving. However, the PFE needs to be able to handle next hop chaining in order to understand the next hops when provided in this manner.

If the PFE is an older-generation hardware that cannot handle next hop chaining and therefore does not understand the next hops when provided in this manner, then the derivation module (a shim layer either in the PFE or in the kernel) needs to generate the "flattened" rewrites and next hops as follows:

TABLE 7

| Derived Next Hop | Derived NH index |
|---|---|
| Concatenate(VPN-label_1, LSP_PE 12A_router 17A, L2_PE 12A_router 17A) | DN_1 |
| Concatenate(VPN-label_2, LSP_PE 12A_router 17A, L2_PE 12A_router 17A) | DN_2 |
| ... | ... |
| Concatenate(VPN-label_i, LSP_PE 12A_router 17A, L2_PE 12A_router 17A) | DN_i |
| ... | ... |
| Concatenate(VPN-label_n LSP_PE 12A_router 17A, L2_PE 12A_router 17A) | DN_n |

TABLE 8

| Routes | NH |
|---|---|
| <Prefix1> | DN_1 |
| <Prefix2> | DN_2 |
| ... | ... |
| <Prefix_i> | DN_i |
| ... | ... |
| <Prefix_n> | DN_n |

Further details relating to next hop chaining may be found in application Ser. No. 12/195,686, filed on Aug. 21, 2008, entitled "NEXT HOP CHAINING FOR FORWARDING DATA IN A NETWORK SWITCHING DEVICE," the entire contents of which are incorporated by reference herein.

As another example, the techniques described herein may also apply to derivation of multicast next hops. This is yet another situation in which different types of underlying forwarding plane architecture may have different capabilities that need to be taken into account for programming the PFEs with forwarding structures. Referring to FIG. 1, in some embodiments system 10 may be used to distribute multicast communications. For example, service provider network 14 may provide multicast services to allow CE 18A to send multicast content to customers of customer networks 19B and 19C. Referring to FIG. 3, routing protocols 40 may include multicast protocols, such as Protocol Independent Multicast (PIM), Internet Group Management Protocol (IGMP), or other protocol for use in multicast communication.

PFEs 30A-30N and switch fabric 28 of routing node 20 may have different capabilities and limitations with regard to multicast communication, depending on the underlying forwarding hardware architecture. For example, some routing nodes 20 may not have a switch fabric 28, while other routing nodes 20 may have a switch fabric 28 as shown in FIG. 2. In accordance with the principles of the invention, in some aspects, forwarding structure control module 52 is aware of the underlying architecture of routing node 20 in this regard, and provides multicast distribution trees to each of PFEs 30 that are tailored to the requirements of the forwarding plane architecture of routing node 20. In another aspect, PFEs 30 are themselves aware of requirements of the forwarding plane architecture, and make requests (e.g., upcalls) to forwarding structure control module 52 to obtain one or more appropriate multicast distribution trees.

Figure 10:
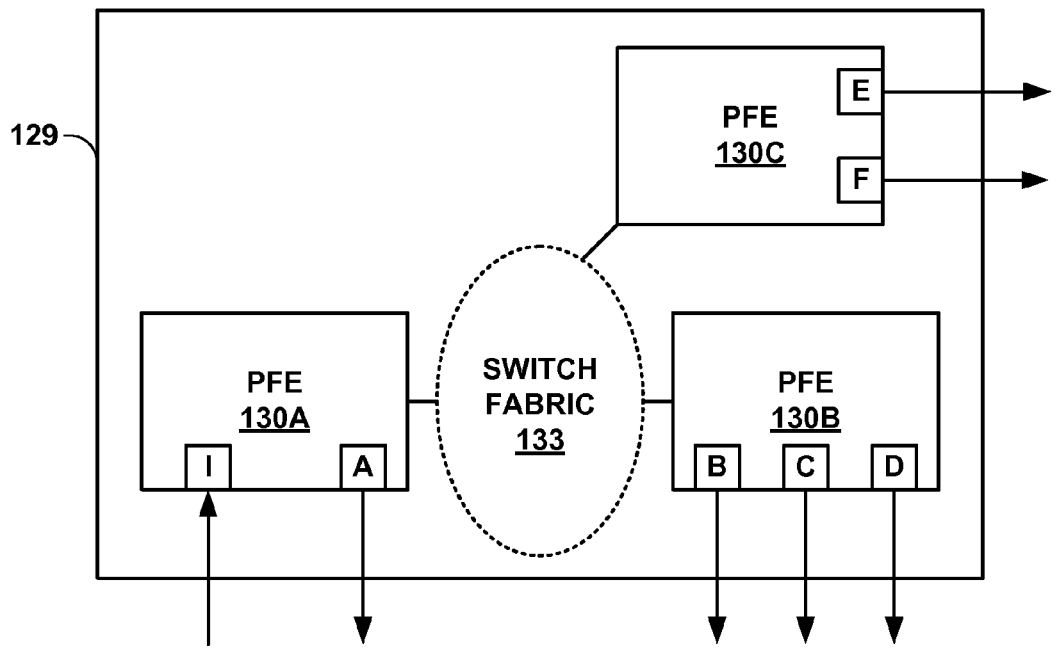
FIG. 10 is a block diagram illustrating an example packet forwarding engine in further detail.

FIG. 10 is a block diagram illustrating an example chassis 129 of a routing node having distributed PFEs 130A-130C ("PFEs 130") connected via switch fabric 133. In the example of FIG. 10, switch fabric 133 is not active, i.e., switch 133 passively forwards packets from one of PFEs 130 to another and does not itself replicate packets. As a result, PFEs 130 themselves carry out the task of packet replication for multicast. In the example shown in FIG. 10, a packet ingresses on interface I of PFE 130A, and copies of the packet are output from interfaces A-F of PFEs 130A-130C of the routing node. The principles of the invention may apply, for example, in the situation in which a routing node having a switch fabric performs multicast replication.

Figure 11A:
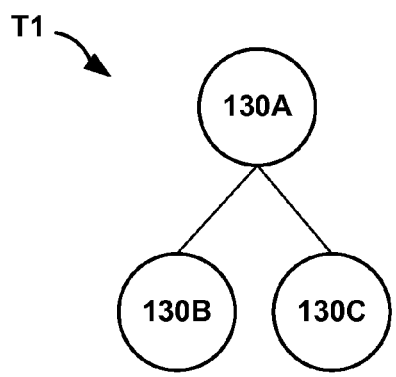
FIGS. 11A and 11B are block diagrams illustrating example multicast distribution trees that may be generated by a network device.
Figure 11B:
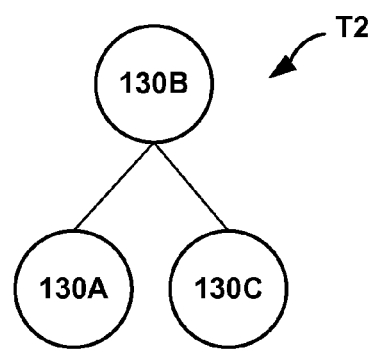

FIGS. 11A and 11B are block diagrams illustrating example multicast replication trees T1 and T2 that may be generated by a network device. So as not to burden a single PFE 130 in the multicast path with replication for all egress interfaces, the control plane sets up an internal replication (binary) tree. The nodes of the tree represent the PFEs that house egress interfaces on a specific multicast list. Each internal node in the distribution tree replicates packets to two other PFEs. Depending on the particular tree and the ingress/egress multicast interfaces on the ingress PFE, the ingress PFE 130 could also be an internal node in the replication tree. In this situation, the net PFE bandwidth for replication is sub-optimal. Hence, two distinct replication trees T1 and T2 are set up and one or the other replication tree is chosen for multicast replication based on the identity of the ingress PFE 130 so as not to suffer suboptimal replication bandwidth at the ingress PFE 130. Due to this, two multicast next hops have to be allocated in the control plane. Thus, in the example situation illustrated in FIG. 10 where PFE 130A is the ingress PFE, multicast replication tree T2 would be chosen from the two installed replication trees for performing the multicast replication because PFE 130A is not an internal node in multicast replication tree T2.

In some implementations of routing nodes having other types of forwarding plane architectures, it may not be necessary to install multiple replication trees. For example, the routing node may not have a switch fabric, or the switch fabric may be an "active" fabric that performs the multicast replication in the switch fabric, or multicast replication may be performed through a mechanism that sends the packet for replication to two other PFEs determined dynamically, instead of via the static tree scheme mentioned earlier. The techniques described herein allow the control plane and high-level routing protocols and much of the routing engine kernel to be unconcerned with these low-level issues of the underlying forwarding plane architecture, e.g., PFE and chassis setup. These details are hidden from the control plane, and handled by forwarding structure control module 52 in the kernel 42 or by forwarding structure derivation module 56 within the PFE 130 that performs upcalls to the kernel 42. The routing engine 26 may therefore maintain an abstract, generic view when creating the forwarding information. Routing engine 26 may create generic forwarding information and store this generic forwarding information to FIB 46A. For example, the generic forwarding information may be expressed as follows:

TABLE 9

| Routes | NHs | NH Action Identifier |
|---|---|---|
| $\{I_1, \ldots, I_N\}$ | $\{I_1, \ldots, I_N\}$ | {Replicate} |

This abstract, generic forwarding information states that packets destined for particular routes $\{I_1, \ldots, I_N\}$ should be replicated and sent out to next hops $\{I_1, \ldots, I_N\}$. The NH action identifier identifies that the action of next hop "replicate" should be applied, i.e., multicast replication should be performed. Based on the generic forwarding information of FIB 46A provided by the upper-level software, kernel 42 invokes forwarding structure control module 52 to create a derived multicast replication trees that takes into account the limitations of the underlying forwarding plane architecture.

As one example, forwarding structure control module 52 creates multicast distribution trees T1 and T2, which are multicast distribution tree specifically designed with the limitations of PFE 131A in mind. Multicast distribution tree T2 offloads the packet replication such that the ingress PFE 130A is not burdened with multiple rounds of replication.

Alternatively, forwarding structure derivation module 56 of one of PFEs 30 initiates creation of the multicast distribution tree based on the generic forwarding information provided by the higher-level software process (e.g., a multicast protocol or a routing protocol). In this case, forwarding structure derivation module 56 may make upcalls to forwarding structure control module 52 to obtain information such as indices, and forwarding structure control module 52 keeps track of the information doled out to PFEs 30.

In this way, the techniques of the invention allow routing engine 26 to maintain an abstract view of the forwarding information that it creates for FIB 46A without requiring any knowledge of the limitations of the underlying forwarding plane architecture. Thus, routing protocols 40 may create and store generic forwarding information even when such forwarding information is not in a form that is optimal for use by one or more of PFEs 30. Routing engine 26 therefore need not be concerned with the underlying intricacies of forwarding plane architecture, but rather is platform-independent for purposes of packet forwarding.

Moreover, the techniques described herein are not limited to derivation of next hops, but may also apply to derivation of interfaces or other forwarding structures. For example, the techniques may also apply to automatically sensing some condition on the fly, and based on the sensed condition, forming the interfaces on which to output packets.

Figure 12:
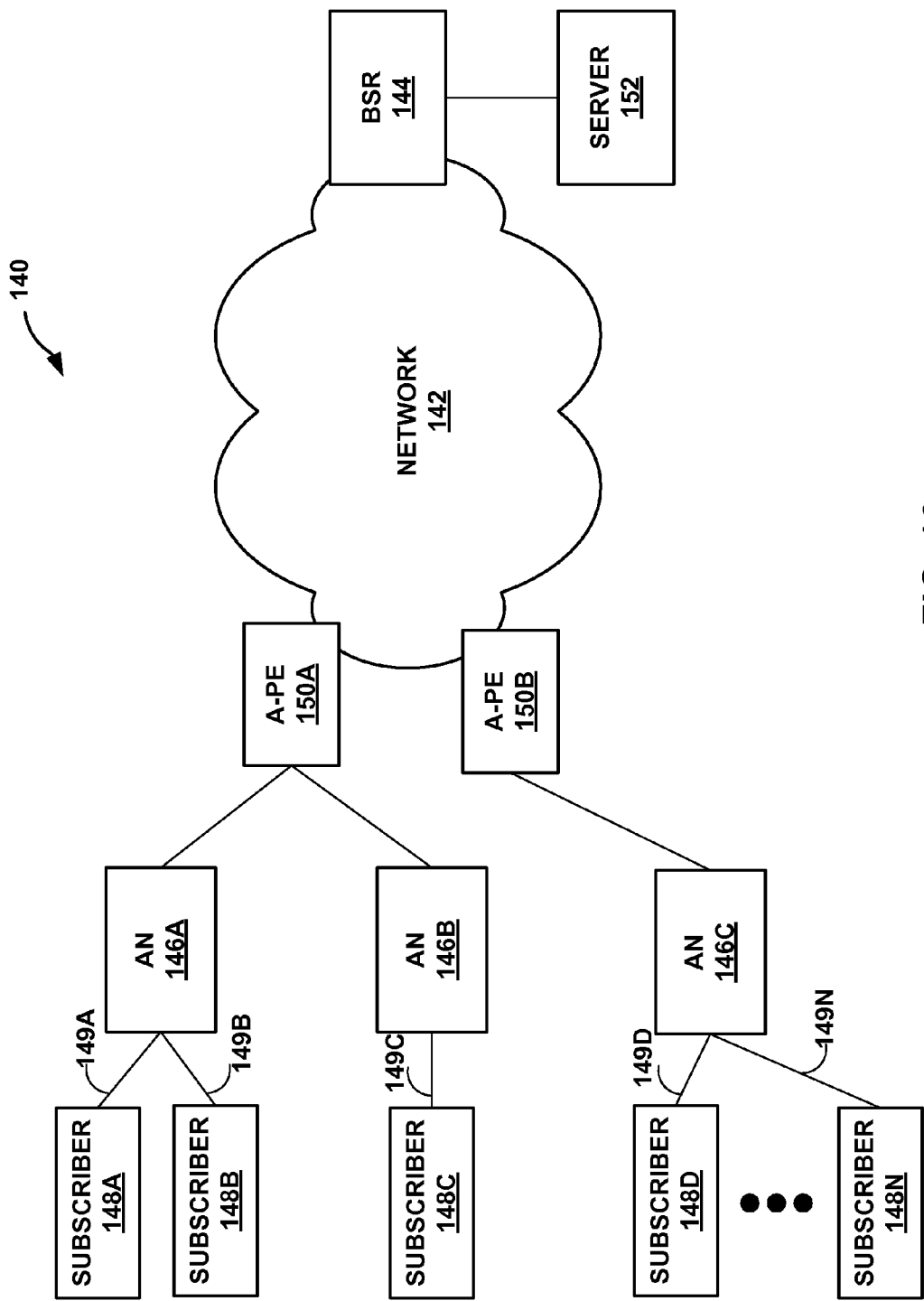
FIG. 12 is a block diagram illustrating an example broadband networking environment in which a network provides connectivity between a broadband services router (BSR) and access nodes.

As another example, the techniques described herein may also be applied within a broadband networking environment. FIG. 12 is a block diagram illustrating an example broadband networking environment 140 in which a network 142 provides connectivity between a broadband services router (BSR) 144 and access nodes 146A-146C (collectively, ANs 146). BSR 144 is a layer three (L3) network device that provides broadband network services to subscriber devices 148A-148N (collectively, subscriber devices 148). For example, BSR 144 may be a router, a Broadband Remote Access Server (B-RAS), or a Broadband Network Gateway (BNG). ANs 146 are layer two (L2) network devices, such as switches or access multiplexers, e.g., Digital Subscriber Line Access Multiplexers (DSLAMs) or Cable Modem Termination Systems (CMTSs). As another example, ANs 146 may be access nodes for mobile-based networks or 3G cellular networks. As shown in FIG. 12, ANs 146 and Access-Provider Edge (A-PE) devices 150A-150B (collectively, A-PEs 150) couple subscriber devices 148 to network 142. Subscriber devices 148 may be, for example, personal computers, servers, laptop computers, handheld computers, personal digital assistants (PDAs), cellular telephones, wireless communication devices, or network-enabled appliances, such as digital television set-top boxes.

Subscriber devices 148 are coupled to ANs 146 of the SP domain via access lines 149A-149N (collectively, access lines 149). The SP domain uses BSR 144 to provide a variety of multimedia services to the subscribers associated with subscriber devices 148. For example, the SP domain may allow the subscribers to receive multicast streams on subscriber devices 148 via BSR 144. For example, the SP domain makes multicast streams available to the subscribers, and the subscribers request and receive multicast streams on their associated subscriber devices 148. Multicast streams may include, for example, video, audio, data, voice, or any combination thereof. The SP domain may also use BSR 144 to provide packet transmission according to a Quality of Service (QoS) class for particular unicast packet flows, such as Voice over Internet Protocol (VoIP) calls, for the subscribers. As another example, the SP domain may use BSR 144 to manage service profiles that vary from subscriber to subscriber. A service profile may define a one or more general Quality of Service (QoS) classes for all inbound or outbound packet traffic for a particular customer.

BSR 144 may act as a B-RAS or a Broadband Network Gateway (BNG) for subscriber devices 148. Consequently, BSR 144 may authenticate the subscriber associated with subscriber device 148A, and determine whether the subscriber is authorized to receive the multicast stream. A server 152 available within SP domain may store information identifying subscribers and indicating what multicast streams the subscribers are authorized to receive. When a subscriber associated with one of subscriber devices 148 logs on or otherwise activates its multimedia service account, BSR 144 may query server 152 to authenticate the subscriber and receive authorization information for the subscriber. Server 152 may, for example, be a Remote Authentication Dial-In User Service (RADIUS) server. BSR 144 is a layer three (L3) network device that operates within the third layer of the OSI reference model, i.e., the network layer. Access nodes 14 are layer two (L2) network devices that operate within the second layer of the OSI reference model, i.e., the data link layer.

In some embodiments, BSR 144 may model subscriber devices 148 as logical interfaces. BSR 144 may attempt to prevent address spoofing by performing a check that an IP address and media access control (MAC) address pair of an ingressing packet is valid. Due to hardware and lookup limitations of chipsets, in some embodiments the IP-MAC address pair validation may be done via a firewall filter. In future hardware and/or software implementations, a lighter-weight construct than a logical interface may be used to model a subscriber. In addition, the IP-MAC address pair validation may be carried out through route lookup (e.g., reverse ARP lookup) instead of a firewall match (since a firewall match could be a more heavyweight operation, and it involves having to install/delete these firewalls). It is possible that these different types of hardware may need to co-exist on the same BSR 144, so each PFE of BSR 144 needs to have a view of the forwarding mechanism that it can work with. From the point of view of control plane scaling and abstraction, the future hardware/software implementation is attractive, since it removes some of the entities that the control plane would have to otherwise create (e.g., interfaces, firewall filters).

In one embodiment, a forwarding structure control module acting as a "shim layer" within a kernel of BSR 144 may be aware of the requirements and capabilities of the different types of hardware within the underlying forwarding plane architecture. The forwarding structure control module may derive and install the interfaces and firewall filters needed by the older generation PFEs. In another embodiment, the "older generation PFEs" that need an older model of forwarding can do an upcall to a forwarding structure control module within the kernel of BSR 144 and the appropriate interfaces and firewall filters would be derived and instantiated on those older generation PFEs only. In this manner, the control plane of BSR 144 need not be concerned with the specifics of the underlying forwarding plane architecture, but can instead create forwarding structures without regard to the limitations of the underlying forwarding plane architecture.

Various embodiments of the invention have been described. These and other embodiments are within the scope of the following claims.

The invention claimed is:

1. A method comprising:
with a software module executing above an operating system of a network device, creating a set of forwarding structures for use in forwarding network traffic with the network device without regard to limitations of an underlying architecture of a forwarding plane of the network device;
providing the set of forwarding structures to a forwarding structure control module operative within or below the operating system of the network device;
with the forwarding structure control module, creating a set of derived forwarding structures for installation in the forwarding plane based on the set of forwarding structures created by the software module, wherein creating the derived set of forwarding structures comprises creating the derived set of forwarding structures in accordance with the limitations of the underlying architecture of the forwarding plane;
installing the derived set of forwarding structures within the forwarding plane;
receiving a packet on an interface of the network device; and
processing the packet in accordance with the installed derived set of forwarding structures.

2. The method of claim 1, wherein the software module comprises a routing protocol software process, further comprising:
maintaining, with the routing protocol software process, routing information in accordance with routes through a network.

3. The method of claim 1, wherein providing the set of forwarding structures comprises:
communicating the set of forwarding structures from the software module to the operating system; and
communicating the set of forwarding structures from the operating system to the forwarding structure control module operative within or below the operating system of the network device.

4. The method of claim 3, wherein the forwarding structure control module is operative within a lower-layer portion of a kernel of the operating system, and wherein the lower-layer portion of the kernel has knowledge of the limitations of the underlying architecture of the forwarding plane.

5. The method of claim 1, wherein the forwarding structure control module is operative within a packet forwarding engine of the forwarding plane of the network device, and wherein the packet forwarding engine is aware of the limitations of its underlying hardware platform.

6. The method of claim 5, further comprising issuing a request from the packet forwarding engine to a lower-layer portion of a kernel of the operating system, wherein the request specifies information needed for creating the set of derived forwarding structures.

7. The method of claim 1, wherein creating the set of derived forwarding structures comprises creating the set of derived forwarding structures in accordance with a forwarding plane that includes at least one packet forwarding engine having limited forwarding structure derivation capabilities, and at least one packet forwarding engine having advanced forwarding structure derivation capabilities.

8. The method of claim 7, wherein creating the set of derived forwarding structures comprises creating the set of derived forwarding structures in accordance with a forwarding plane that includes at least one packet forwarding engine having a first-generation hardware platform that is not capable of derivation of next hops that conform to the split-horizon rule after receiving an inbound packet and prior to forwarding the packet and at least one packet forwarding engine having a second-generation hardware platform that is capable of derivation of next hops that conform to the split-horizon rule after receiving the inbound packet and prior to forwarding the packet.

9. The method of claim 1, wherein creating the set of derived forwarding structures comprises creating a set of derived next hops for installation in the forwarding plane.

10. The method of claim 1, wherein creating the set of derived forwarding structures comprises creating a set of derived interfaces for installation in the forwarding plane.

11. The method of claim 1, further comprising providing, from the software module to the forwarding structure control module, an action identifier associated with the set of forwarding structures created by the software module, wherein the action identifier identifies a type of action to be performed by the forwarding plane in creating the derived set of forwarding structures.

12. The method of claim 11, wherein providing the action identifier comprises providing an action identifier indicating that multicast replication should be performed.

13. The method of claim 11, wherein providing the action identifier comprises providing an action identifier indicating that next hop chaining should be performed.

14. The method of claim 11, wherein providing the action identifier comprises providing an action identifier indicating that derived next hops should conform to the split-horizon rule.

15. The method of claim 1, wherein processing the packet comprises one or more of forwarding the packet, applying firewall actions to the packet, applying services to the packet, performing network address translation upon the packet, accepting the packet at a routing engine of the network device, and discarding the packet.

16. A network device comprising:
an interface that receives network traffic from a network;
a forwarding plane configured to forward the network traffic received by the network device to next hops in accordance with stored forwarding information;
a processor that executes a software module above an operating system of a network device, wherein the software module is configured to create a set of forwarding structures for use in forwarding network traffic with the network device without regard to limitations of an underlying architecture of the forwarding plane;
a forwarding structure control module operative within or below the operating system of the network device,
wherein the software module is configured to provide the set of forwarding structures to the forwarding structure control module, and
wherein the forwarding structure control module is configured to create a set of derived forwarding structures based on the set of forwarding structures provided by the software module for installation in the forwarding information of the forwarding plane, wherein the forwarding structure control module is configured to create the derived set of forwarding structures in accordance with the limitations of the underlying architecture of the forwarding plane.

17. The network device of claim 16, wherein the software module comprises a routing protocol software process that maintains routing information in accordance with routes through a network.

18. The network device of claim 16, wherein the software module communicates the set of forwarding structures from the software module to the operating system, and wherein the operating system communicates the set of forwarding structures to the forwarding structure control module operative within or below the operating system of the network device.

19. The network device of claim 16, wherein the forwarding structure control module is operative within a lower-layer portion of a kernel of the operating system, and wherein the lower-layer portion of the kernel has knowledge of the limitations of the underlying architecture of the forwarding plane.

20. The network device of claim 16, wherein the forwarding structure control module is operative within a packet forwarding engine of the forwarding plane of the network device, and wherein the packet forwarding engine is aware of the limitations of its underlying hardware platform.

21. The network device of claim 16, wherein the network device is one of a layer two (L2) switch or an L2-enabled router.

22. A non-transitory computer-readable medium comprising instructions for causing a programmable processor to:

with a software module executing above an operating system of a network device, create a set of forwarding structures for use in forwarding network traffic with the network device without regard to limitations of an underlying architecture of a forwarding plane of the network device;

provide the set of forwarding structures to a forwarding structure control module operative within or below the operating system of the network device;

with the forwarding structure control module, create a set of derived forwarding structures for installation in the forwarding plane based on the set of forwarding structures created by the software module, wherein creating the derived set of forwarding structures comprises creating the derived set of forwarding structures in accordance with the limitations of the underlying architecture of the forwarding plane;

install the derived set of forwarding structures within the forwarding plane;

receive a packet on an interface of the network device; and process the packet in accordance with the installed derived set of forwarding structures.

* * * * *